US010427004B2

(12) United States Patent
Sullivan et al.

(10) Patent No.: US 10,427,004 B2
(45) Date of Patent: Oct. 1, 2019

(54) GOLF BALLS INCORPORATING THERMOPLASTIC BLENDS(S) OF IONOMER(S), THERMOPLASTIC POLYMER(S), PGM REACTIVE CROSSLINKER(S), AND CATALYST(S)

(71) Applicant: Acushnet Company, Fairhaven, MA (US)

(72) Inventors: Michael J. Sullivan, Old Lyme, CT (US); Brian Comeau, Berkley, MA (US); Michael Michalewich, Norton, MA (US)

(73) Assignee: Acushnet Company, Fairhaven, MA (US)

( * ) Notice: Subject to any disclaimer, the term of this patent is extended or adjusted under 35 U.S.C. 154(b) by 0 days.

(21) Appl. No.: 16/186,935

(22) Filed: Nov. 12, 2018

(65) Prior Publication Data
US 2019/0143180 A1 May 16, 2019

Related U.S. Application Data

(63) Continuation-in-part of application No. 16/186,806, filed on Nov. 12, 2018, and a continuation-in-part of application No. 16/186,856, filed on Nov. 12, 2018, which is a continuation of application No. 16/186,806, filed on Nov. 12, 2018, and a continuation of application No. 15/813,463, filed on Nov. 15, 2017, now Pat. No. 10,150,008, and a continuation-in-part of application No. 15/813,463, filed on Nov. 15, 2017, now Pat. No. 10,150,008, and a continuation-in-part of application No. 15/813,486, filed on Nov. 15, 2017, now Pat. No. 10,124,214.

(51) Int. Cl.
*C08L 23/00* (2006.01)
*C08L 23/04* (2006.01)
*C08L 75/00* (2006.01)
*A63B 37/00* (2006.01)
*C08L 23/08* (2006.01)
*C08L 75/04* (2006.01)

(52) U.S. Cl.
CPC ...... *A63B 37/0024* (2013.01); *A63B 37/0033* (2013.01); *A63B 37/0075* (2013.01); *C08L 23/0876* (2013.01); *C08L 23/00* (2013.01); *C08L 23/08* (2013.01); *C08L 23/0846* (2013.01); *C08L 23/0869* (2013.01); *C08L 75/00* (2013.01); *C08L 75/04* (2013.01)

(58) Field of Classification Search
CPC ............ C08L 23/0876; C08L 23/0869; C08L 23/0846; C08L 23/08; A63B 37/0074; A63B 37/0075; A63B 37/0076; A63B 37/0003
See application file for complete search history.

(56) References Cited

U.S. PATENT DOCUMENTS

| | | |
|---|---|---|
| 4,419,471 A | 12/1983 | Nelsen et al. |
| 4,666,777 A | 5/1987 | Ash et al. |
| 4,876,313 A | 10/1989 | Lorah |
| 5,006,592 A | 4/1991 | Oshima et al. |
| 5,183,858 A | 2/1993 | Sasaki et al. |
| 5,206,299 A | 4/1993 | Oshima et al. |
| 5,237,015 A | 8/1993 | Urban |
| 5,242,982 A | 9/1993 | Oshima et al. |
| 5,280,075 A | 1/1994 | Oshima et al. |
| 5,280,076 A | 1/1994 | Sasaki et al. |
| 5,290,858 A | 3/1994 | Sasaki et al. |
| 5,304,707 A | 4/1994 | Blankenship et al. |
| 5,324,780 A | 6/1994 | Oshima et al. |
| 5,362,804 A | 11/1994 | Oshima et al. |
| 5,403,894 A | 4/1995 | Tsai et al. |
| 5,453,458 A | 9/1995 | Takeuchi et al. |
| 5,711,723 A * | 1/1998 | Hiraoka ............ A63B 37/0003 473/374 |
| 5,971,870 A | 10/1999 | Sullivan et al. |
| 6,001,930 A | 12/1999 | Rajagopalan |
| 6,245,862 B1 | 6/2001 | Rajagopalan |
| 6,251,991 B1 | 6/2001 | Takesue et al. |
| 6,300,407 B1 | 10/2001 | Machleder |
| 6,319,152 B1 | 11/2001 | Takesue et al. |
| 6,384,135 B2 | 5/2002 | Takesue et al. |
| 6,777,500 B2 | 8/2004 | Lean et al. |
| 6,858,301 B2 | 2/2005 | Ganapathiappan |
| 6,885,075 B2 | 4/2005 | Kuhara et al. |
| 6,887,167 B2 * | 5/2005 | Kato ................ A63B 37/0003 473/371 |
| 6,960,630 B2 * | 11/2005 | Cavallaro .......... A63B 37/0003 473/373 |
| 7,091,269 B2 * | 8/2006 | Takesue ............ C08L 23/0876 473/373 |

(Continued)

FOREIGN PATENT DOCUMENTS

JP   H11-137725   5/1999

OTHER PUBLICATIONS

RSC Advances, RSC Publishing; The Royal Society of Chemistry 2013; Core-shell polymers: a review; p. 15543-15565.

*Primary Examiner* — John E Simms, Jr.
(74) *Attorney, Agent, or Firm* — Margaret C. Barker

(57) ABSTRACT

Golf ball comprising thermoplastic blend of (i) ionomer(s); (ii) different thermoplastic polymer(s); (iii) reactive crosslinker(s) consisting of maleic group-modified polymer(s), and/or glycidyl (meth)acrylate-modified polymer(s) ("PGM"); and (iv) catalyst(s); ionomer present in amount of about 45 wt % or greater, and PGM present in amount of from about 2 wt % to about 35 wt %. Thermoplastic polymer may be present in amount of from about 8 wt % to about 50 wt %; or from about 25 wt % to about 45 wt %; or from about 35 wt % to about 50 wt %. Amount of ionomer may be greater than amount of thermoplastic polymer. Thermoplastic polymer may be a polyurethane present in amount of greater than 20 wt % and up to about 40 wt %; and the PGM is present in amount of from about 5 wt % to about 30 wt %. In some embodiments, PGM is present in an amount of from about 15 wt % to about 35 wt %.

18 Claims, No Drawings

(56) References Cited

U.S. PATENT DOCUMENTS

| | | |
|---|---|---|
| 7,131,915 B2 | 11/2006 | Sullivan et al. |
| 7,700,689 B2 | 4/2010 | Egashira et al. |
| 8,920,264 B2 | 12/2014 | Kennedy, III |
| 9,119,990 B2 | 9/2015 | Fitchett et al. |
| 2003/0130052 A1 | 7/2003 | Kim |
| 2004/0176186 A1* | 9/2004 | Sullivan ............ A63B 37/0003 473/371 |
| 2011/0152010 A1* | 6/2011 | Kim ................... A63B 37/0003 473/377 |
| 2011/0207556 A1* | 8/2011 | Rajagopalan ...... A63B 37/0003 473/376 |
| 2011/0224023 A1 | 9/2011 | Tutmark |
| 2012/0094784 A1 | 4/2012 | Hebert et al. |
| 2012/0165469 A1 | 6/2012 | Michalewich et al. |
| 2014/0004976 A1 | 1/2014 | Rajagopalan et al. |
| 2014/0073453 A1* | 3/2014 | Bulpett .............. A63B 37/0035 473/371 |
| 2014/0187348 A1* | 7/2014 | Kim ....................... A63B 45/00 473/371 |
| 2016/0175659 A1* | 6/2016 | Sullivan ............. A63B 37/0039 473/376 |
| 2017/0007890 A1* | 1/2017 | Jeon ................... A63B 37/0076 |
| 2017/0028263 A1* | 2/2017 | Sullivan ................ C08K 5/098 |
| 2018/0147452 A1 | 5/2018 | Song et al. |

\* cited by examiner

GOLF BALLS INCORPORATING THERMOPLASTIC BLENDS(S) OF IONOMER(S), THERMOPLASTIC POLYMER(S), PGM REACTIVE CROSSLINKER(S), AND CATALYST(S)

CROSS-REFERENCE TO RELATED APPLICATIONS

This application is a continuation-in-part of both of co-pending U.S. patent application Ser. No. 16/186,806, filed on Nov. 12, 2018 (the "'806 application") and co-pending U.S. patent application Ser. No. 16/186,856, filed on Nov. 12, 2018 (the "'856 application"). The '856 application is a continuation of the '806 application, which is a continuation-in-part of both of co-pending U.S. patent application Ser. No. 15/813,463, filed on Nov. 15, 2017 (the "'463 application") and co-pending U.S. patent application Ser. No. 15/813,486, filed on Nov. 15, 2017 (the "'486 application"). The '486 application is a continuation of the '463 application. Each of these applications is hereby incorporated herein by reference in its entirety.

FIELD OF THE INVENTION

Golf balls incorporating durable thermoplastic polyurethane compositions and methods of making same.

BACKGROUND OF THE INVENTION

Both professional and amateur golfers use multi-piece, solid golf balls today. Basically, a two-piece solid golf ball includes a solid inner core protected by an outer cover. The inner core is made of a natural or synthetic rubber such as polybutadiene, styrene butadiene, or polyisoprene. The cover surrounds the inner core and may be made of a variety of materials including ethylene acid copolymer ionomers, polyamides, polyesters, polyurethanes, and polyureas.

Three-piece, four-piece, and even five-piece balls have become more popular over the years. More golfers are playing with these multi-piece balls for several reasons including new manufacturing technologies, lower material costs, and desirable ball playing performance properties. Many golf balls used today have multi-layered cores comprising an inner core and at least one surrounding outer core layer. For example, the inner core may be made of a relatively soft and resilient material, while the outer core may be made of a harder and more rigid material. The "dual-core" sub-assembly is encapsulated by a single or multi-layered cover to provide a final ball assembly. Different materials are used in these golf ball constructions to impart specific properties and playing features to the ball.

For instance, in recent years, there has been high interest in using polyurethane compositions to make golf ball covers. Generally, polyurethane compositions contain urethane linkages formed by reacting an isocyanate group (—N═C═O) with a hydroxyl group (OH). Polyurethanes are produced by the reaction of a multi-functional isocyanate with a polyol in the presence of a catalyst and other additives. The chain length of the polyurethane prepolymer is extended by reacting it with hydroxyl-terminated and amine curing agents.

In Sullivan et al., U.S. Pat. No. 5,971,870, thermoplastic or thermosetting polyurethanes and ionomers are described as being suitable materials for making outer cover and any inner cover layer. The cover layers can be formed over the cores by injection-molding, compression molding, casting or other conventional molding techniques. Preferably, each cover layer is separately formed. In one embodiment, the inner cover layer is first injection molded over the core in a cavity mold, subsequently any intermediate cover layers are injection molded over the inner cover layer in a cavity mold, and finally the outer cover layer is injection molded over the intermediate cover layers in a dimpled cavity mold.

In Sullivan et al., U.S. Pat. No. 7,131,915, the outer cover can be made from a polyurethane composition and various aliphatic and aromatic diisocyanates are described as being suitable for making the polyurethanes. Depending on the type of curing agent used, the polyurethane composition may be thermoplastic or thermoset in nature. Sullivan '915 further discloses that compositions for the intermediate cover layer and inner cover layer may be selected from the same class of materials as used for the outer cover layer. In other embodiments, ionomers such as HNPs, can be used to form the intermediate and inner cover layers. The castable, reactive liquid used to form the urethane elastomer material can be applied over the core using a variety of techniques such as spraying, dipping, spin coating, or flow coating methods.

As discussed above, both thermoplastic and thermosetting polyurethanes can be used to form golf ball covers. Thermoplastic polyurethanes have minimal cross-linking; any bonding in the polymer network is primarily through hydrogen bonding or other physical mechanism. Because of their lower level of cross-linking, thermoplastic polyurethanes are relatively flexible. The cross-linking bonds in thermoplastic polyurethanes can be reversibly broken by increasing temperature such as during molding or extrusion. That is, the thermoplastic material softens when exposed to heat and returns to its original condition when cooled. On the other hand, thermoset polyurethanes become irreversibly set when they are cured. The cross-linking bonds are irreversibly set and are not broken when exposed to heat. Thus, thermoset polyurethanes typically have a high level of cross-linking and are relatively rigid.

One advantage with using thermoplastic polyurethane, urea and/or hybrid (TPU) compositions to form golf ball covers is that they have good processability. The resulting thermoplastic materials generally have good melt-flow properties and different molding methods may be used to form the covers. Accordingly, thermoplastic polyurethanes, urea and/or hybrid have been used for years, especially in golf ball covers.

Unfortunately, there are known drawbacks associated with using TPU materials, such as being less durable and less tough than other polymers. In this regard, a resulting thermoplastic polyurethane golf ball cover may not have high mechanical strength, impact durability, and cut and scuff (groove shear)-resistance.

Thus, manufacturers have tried treating thermoplastic polyurethanes in order to enhance the durability and strength of the polymer. For example, an isocyanate may be compounded into a masterbatch and then the masterbatch may be added to the thermoplastic polyurethane composition prior to molding. In another example, the molded thermoplastic polyurethane cover may be dipped into an isocyanate solution. Treating the thermoplastic polyurethane material with isocyanates helps improve the physical properties such as mechanical strength, impact durability, and cut and scuff (groove shear)-resistance of the material. In some cases, the physical properties may not only increase, but they may actually increase beyond the values of the non-refined material.

For example, Kennedy, III, U.S. Pat. No. 8,920,264 and Matroni, U.S. Pat. No. 9,119,990 disclose isocyanate dipping methods, whereby a golf ball having a thermoplastic polyurethane cover is treated with a solution of isocyanate. The isocyanate solution can contain a solvent, for example, acetone or methyl ethyl ketone (MEK), at least one isocyanate compound, and a catalyst. The ball is soaked in the isocyanate solution and this causes the isocyanate compound to permeate the cover. The isocyanate compound cross-links the thermoplastic polyurethane cover material, and this improves the physical properties of the cover such as durability and scuff-resistance.

Manufacturers have also tried treating and/or coating layers about a TPU cover layer in order to improve golf ball properties. In one approach, differing relative proportions of isocyanate functional groups in each of the TPU cover layer and the coating layer enabled the coating layer to react with the TPU cover layer.

However, such approaches require additional processing steps which can be time-consuming and therefore reduce efficiency as well as increase manufacturing costs. Related and allowed U.S. application Ser. No. 15/813,463 ("'463 application) and U.S. application Ser. No. 15/813,486 ("'486 application) address these problems and provide novel solutions wherein at least one layer is comprised of a mixture consisting of (i) thermoplastic polymer (thermoplastic polyurethane(s), urea(s) and/or polyurethane-urea hybrid(s)) ("TPU") and (ii) polymethyl methacrylate-based copolymer(s) or a plurality of core-shell polymers wherein the core and/or shell contains polymethyl methacrylate-based copolymer(s). The resulting materials and golf balls are reliably durable and possess good physical and playing performance properties and yet can be produced more simply and cost effectively without the need for additional treatments and/or coating layers.

Subsequently, related U.S. application Ser. No. 16/186,806 ("'806 application") and U.S. application Ser. No. 16/186,856 ("'856 application) introduced thermoplastic blends which incorporate some of the teachings and benefits of the materials of parent applications '463 and '486 to create novel golf balls and layers which possess and produce the desired physical and playing performance properties of ionomers, TPU(s) and polymethyl (meth)acrylate-based copolymer(s) and/or a plurality of core-shell polymers having a core and/or a shell comprising same in a single layer, without encountering the problems associated with making and using conventional TPU(s). Such golf balls and layers are reliably durable, and can be produced simply and cost-effectively within existing golf ball manufacturing processes. Prior attempts to create ionomer(s)/TPU(s)s blends such as in U.S. Pat. No. 7,700,689 of Egashira et al.; and/or U.S. Publ. No. 2011/0224023 of Tutmark; and/or U.S. Publ. No. 2018/0147452 of Song et al. had not addressed nor resolved these issues.

However, there still remains a need to develop different TPU(s)/ionomer(s) blends based on some of the teachings of the materials of parents '463 and '486 applications and combine multiple unique desired chemical, physical and playing performance properties in a single layer without meanwhile encountering the problems previously associated with making and using conventional TPU(s).

Such novel golf balls and TPU(s)/ionomer(s) blends, if meanwhile capable of being manufactured cost effectively within existing manufacturing processes, would be particularly useful. Golf balls of the present invention and methods for making same address and solve this need.

SUMMARY OF THE INVENTION

Advantageously, a golf ball of the invention may comprise a core and at least one layer comprising a thermoplastic blend of (i) at least one ionomer; (ii) at least one thermoplastic polyurethane; (iii) at least one reactive crosslinker consisting of maleic group-modified polymer(s), glycidyl (meth)acrylate-modified polymer(s), or combinations thereof ("PGM"); and (iv) at least one catalyst; wherein the ionomer is present in an amount of about 45 wt % or greater and the PGM is present in an amount of from about 2 wt % to about 35 wt %. The thermoplastic polyurethane may be present in the blend in an amount of from about 8 wt % to about 50 wt %. In another embodiment, the thermoplastic polyurethane may be present in an amount of from about 25 wt % to about 45 wt %. In yet another embodiment, the thermoplastic polyurethane may be present in an amount of from about 35 wt % to about 50 wt %.

In a specific embodiment, the ionomer is present in the blend in an amount greater than the amount of thermoplastic polyurethane. In one embodiment, the ionomer is present in an amount of from about 45 wt % to about 70 wt %.

In one embodiment, the thermoplastic polyurethane may be present in an amount greater than 20 wt % and up to about 40 wt %; and the PGM is present in an amount of from about 5 wt % to about 30 wt %. In some embodiments, the PGM is present in an amount of from about 15 wt % to about 35 wt %.

The at least one catalyst may be selected from the group consisting of 1,8-Diazabicyclo-[5.4.0]undec-7-ene (DBU), triphenylphosphino imidazole catalysts, chromium III complexes, oxo-centered trinuclear Cr III complexes, 1,4-diazabicyclo[2.2.2]octane, liquid epoxy catalysts, and combinations thereof.

The at least one catalyst may be a tertiary amine.

The at least one catalyst may be included in the four-part thermoplastic blend in an amount of from 0.1 to 10 parts based on 100 parts of PGM. The at least one catalyst may be included in the four-part thermoplastic blend in an amount of from 1.0 to 5.0 parts based on 100 parts of PGM.

A golf ball of the invention may comprise at least one layer comprising a four-part thermoplastic blend consisting of: (i) at least one ionomer; (ii) at least one different thermoplastic polymer consisting of at least one thermoplastic polyurethane, thermoplastic urea, thermoplastic urea-urethane hybrid, or a combination thereof; (iii) at least one reactive crosslinker consisting of maleic group-modified polymer(s), glycidyl (meth)acrylate-modified polymer(s), or combinations thereof ("PGM"); and (iv) at least one catalyst. The four-part thermoplastic blend includes (i), (ii), and (iii) in a wt % ratio I:T:C; wherein I is the wt % of ionomer, T is the wt % of different thermoplastic polymer, and C is the wt % of PGM; and wherein I is >45 and 2≤C<35.

In one embodiment, T is 25-50. In another embodiment, T is about 25-50. In yet another embodiment, T is greater than 25 and up to 50. In still another embodiment, T is 30-50. In one embodiment, T is 35-50. In an alternative embodiment, T is 40-50. T may also be greater than 40 and up to about 50.

In a different embodiment, T is from about 8 to 45.

In one embodiment, I>T. In another embodiment, T>I. In yet another such embodiment, T=I.

In a particular embodiment, I<90. In another particular embodiment, 45<I<70.

In a different embodiment, I is 48-90.

In one such specific embodiment, T is greater than 20 and up to about 40; and C is 3-30.

In one particular embodiment, $15 \leq C < 35$. In another particular embodiment, $20 \leq C < 35$.

In one embodiment, the at least one catalyst may be selected from the group consisting of 1,8-diazabicyclo [5.4.0]undec-7-ene (DBU), triphenylphosphino imidazole catalysts, chromium III complexes, oxo-centered trinuclear Cr III complexes, 1,4-diazabicyclo[2.2.2]octane, liquid epoxy catalysts, and combinations thereof.

In a particular embodiment, at least one catalyst is a tertiary amine.

The catalyst may be included in the four-part thermoplastic blend in an amount of 0.1 to 10 parts based on 100 parts of PGM. In a particular embodiment, the at least one catalyst is included in the four-part thermoplastic blend in an amount of 1.0 to 5.0 parts based on 100 parts of PGM.

In one embodiment, the four-part thermoplastic blend has a material hardness of from about 20 Shore D to about 65 Shore D.

The four-part thermoplastic blend may have a material hardness that is different than the material hardness of the thermoplastic polymer.

In one embodiment, the four-part thermoplastic blend has a material hardness greater than about 20 Shore D and up to about 70 Shore D.

In one embodiment, the at least one layer is a cover layer that surrounds a subassembly and has a hardness H that differs from a hardness $H_{(ii)}$ of (ii) by at least about 5 Shore D hardness points; wherein (ii) has a hardness of from about 20 Shore D to about 70 Shore D.

In another embodiment, the at least one layer is an inner cover layer that surrounds a subassembly and is surrounded by an outer cover layer and has a hardness H that differs from a hardness $H_{(ii)}$ of (ii) by at least about 5 Shore D hardness points; wherein (ii) has a hardness of from about 20 Shore D to about 70 Shore D.

In some embodiments, a golf ball of the invention comprises at least one layer consisting of a four-part thermoplastic blend consisting of: (i) at least one ionomer; (ii) at least one different thermoplastic polymer consisting of at least one thermoplastic polyurethane, thermoplastic urea, thermoplastic urea-urethane hybrid, or combination thereof; (iii) at least one reactive crosslinker consisting of maleic group-modified polymer(s), glycidyl (meth)acrylate-modified polymer(s), or combinations thereof ("PGM"); and (iv) at least one catalyst.

The invention also relates to a method of making a golf ball of the invention, comprising: providing a subassembly; and forming at least one layer about the subassembly consisting of a four-part thermoplastic blend consisting of: (i) at least one ionomer; (ii) at least one different thermoplastic polymer consisting of at least one thermoplastic polyurethane, thermoplastic urea, thermoplastic urea-urethane hybrid, or a combination thereof; (iii) at least one reactive crosslinker consisting of maleic group-modified polymer(s), glycidyl (meth)acrylate-modified polymer(s), or combinations thereof ("PGM"); and (iv) at least one catalyst. The four-part thermoplastic blend includes (i), (ii), and (iii) in a wt % ratio I:T:C; wherein I is the wt % of ionomer, T is the wt % of different thermoplastic polymer, and C is the wt % of PGM; and wherein I is >45 and $2 \leq C < 35$.

In another embodiment, the method of making a golf ball of the invention, comprises: providing a subassembly; and forming at least one layer about the subassembly comprising a four-part thermoplastic blend consisting of: (i) at least one ionomer; (ii) at least one different thermoplastic polymer consisting of at least one thermoplastic polyurethane, thermoplastic urea, thermoplastic urea-urethane hybrid, or a combination thereof; (iii) at least one reactive crosslinker consisting of maleic group-modified polymer(s), glycidyl (meth)acrylate-modified polymer(s), or combinations thereof ("PGM"); and (iv) at least one catalyst.

In other embodiments, the method comprises providing a subassembly consisting of a four-part thermoplastic blend consisting of: (i) at least one ionomer; (ii) at least one different thermoplastic polymer consisting of at least one thermoplastic polyurethane, thermoplastic urea, thermoplastic urea-urethane hybrid, or a combination thereof; (iii) at least one reactive crosslinker consisting of maleic group-modified polymer(s), glycidyl (meth)acrylate-modified polymer(s), or combinations thereof ("PGM"); and (iv) at least one catalyst; and forming at least one layer comprising a thermoset or thermoplastic composition about the subassembly.

Alternatively, the method may comprise providing a subassembly comprising a four-part thermoplastic blend consisting of: (i) at least one ionomer; (ii) at least one different thermoplastic polymer consisting of at least one thermoplastic polyurethane, thermoplastic urea, thermoplastic urea-urethane hybrid, or a combination thereof; (iii) at least one reactive crosslinker consisting of maleic group-modified polymer(s), glycidyl (meth)acrylate-modified polymer(s), or combinations thereof ("PGM"); and (iv) at least one catalyst; and forming at least one layer comprising a thermoset or thermoplastic composition about the subassembly.

DETAILED DESCRIPTION OF THE INVENTION

Advantageously, golf balls of the invention incorporate in at least one layer, such as a cover, novel thermoplastic blend(s) of ionomer(s), TPU, PGM reactive crosslinker(s) (maleic group-modified polymer(s), glycidyl (meth)acrylate-modified polymer(s), or combinations thereof), and at least one catalyst. The thermoplastic blends of the invention are desirably durable and tough, having high mechanical strength, impact durability, and cut and scuff (groove shear)-resistance, providing in a single layer the unique properties of ionomers and TPUs as modified in the four-part thermoplastic blend without meanwhile sacrificing the good processability typically associated with producing thermoplastic materials.

Advantageously, golf balls of the invention include ionomers and TPUs and their respective benefits in a single layer without meanwhile sacrificing processability (e.g., possesses good melt-flow properties) or durability and toughness. The thermoplastic blend can be molded cost-effectively using a wide range of methods, yet displays high mechanical strength, impact durability, and cut and scuff (groove shear)-resistance.

A golf ball of the invention may comprise a core and at least one layer comprising a thermoplastic blend of (i) at least one ionomer; (ii) at least one thermoplastic polyurethane; (iii) at least one reactive crosslinker consisting of maleic group-modified polymer(s), glycidyl (meth)acrylate-modified polymer(s), or combinations thereof ("PGM"); and (iv) at least one catalyst; wherein the ionomer is present in an amount of about 45 wt % or greater and the PGM is present in an amount of from about 2 wt % to about 35 wt %. The thermoplastic polyurethane may be present in the blend in an amount of from about 8 wt % to about 50 wt %. In another embodiment, the thermoplastic polyurethane may be present in an amount of from about 25 wt % to about 45 wt %. In yet another embodiment, the thermoplastic polyurethane may be present in an amount of from about 35 wt % to about 50 wt %.

In a specific embodiment, the ionomer is present in the blend in an amount greater than the amount of thermoplastic polyurethane. In one embodiment, the ionomer is present in an amount of from about 45 wt % to about 70 wt %.

In one embodiment, the thermoplastic polyurethane may be present in an amount greater than 20 wt % and up to about 40 wt %; and the PGM is present in an amount of from about 5 wt % to about 30 wt %. In some embodiments, the PGM is present in an amount of from about 15 wt % to about 35 wt %.

The at least one catalyst may be selected from the group consisting of 1,8-Diazabicyclo-[5.4.0]undec-7-ene (DBU), triphenylphosphino imidazole catalysts, chromium III complexes, oxo-centered trinuclear Cr III complexes, 1,4-diazabicyclo[2.2.2]octane, liquid epoxy catalysts, and combinations thereof.

The at least one catalyst may be a tertiary amine.

The at least one catalyst may be included in the four-part thermoplastic blend in an amount of from 0.1 to 10 parts based on 100 parts of PGM. The at least one catalyst may be included in the four-part thermoplastic blend in an amount of from 1.0 to 5.0 parts based on 100 parts of PGM.

A golf ball of the invention may comprise at least one layer comprising a four-part thermoplastic blend consisting of: (i) at least one ionomer; (ii) at least one different thermoplastic polymer consisting of at least one thermoplastic polyurethane, thermoplastic urea, thermoplastic urea-urethane hybrid, or combination thereof; (iii) at least one reactive crosslinker consisting of maleic group-modified polymer(s), glycidyl (meth)acrylate-modified polymer(s), or combinations thereof ("PGM"); and (iv) at least one catalyst. The four-part thermoplastic blend includes (i), (ii), and (iii) in a wt % ratio I:T:C; wherein I is the wt % of ionomer, T is the wt % of different thermoplastic polymer, and C is the wt % of PGM; and wherein I is >45 and 2≤C<35.

In one embodiment, T is greater than 20 and up to about 50. In another embodiment, T is 25-50. In yet another embodiment, T is about 25-50. In still another embodiment, T is greater than about 25 to 50. In an alternative embodiment, T is 30 to about 50, or greater than about 30 to about 50, or greater than 30 to 60. In a particular embodiment, T is 35-60, or about 35-60, or about 35-50, or greater than 35 to about 50, or about 40-50. In one embodiment, T is greater than 40 and up to about 50. In other embodiments, T is 40-50.

There are different embodiments wherein 8≤T≤50, or T is from about 8 to 40.

In one embodiment, I>T. In an alternative embodiments, T>I. In another embodiment, T=I.

In a specific embodiment, I<90. In a particular embodiment, 45<I<70. In a different embodiment, I is 48-90.

In one such specific embodiment, T is greater than 20 and up to about 40; and C is 3-30.

In one particular embodiment, 15≤C<35. In another particular embodiment, 20≤C<35.

In one embodiment, the at least one catalyst may be selected for example from the group consisting of 1,8-diazabicyclo[5.4.0]undec-7-ene (DBU), triphenylphosphino imidazole catalysts, chromium III complexes, oxo-centered trinuclear Cr III complexes, 1,4-diazabicyclo[2.2.2]octane, liquid epoxy catalysts, and combinations thereof.

One suitable 1,4-diazabicyclo[2.2.2]octane is Dabco® 33-LV. Examples of liquid epoxy catalysts include Hycat® 2000S, Hycat® 3000S, and/or, Hycat® OA manufactured by Dimension Technology chemical Systems, Inc.

In a particular embodiment, at least one catalyst is a tertiary amine.

The catalyst may be included in the four-part thermoplastic blend in an amount of 0.1 to 10 parts based on 100 parts of PGM. In a particular embodiment, the at least one catalyst is included in the four-part thermoplastic blend in an amount of 1.0 to 5.0 parts based on 100 parts of PGM. In other embodiments, the at least one catalyst is included in the four-part thermoplastic blend in an amount of greater than 5.0 parts to 10.0 parts based on 100 parts of PGM.

In one embodiment, the four-part thermoplastic blend has a material hardness of from about 20 Shore D to about 65 Shore D.

The four-part thermoplastic blend may have a material hardness that is different than the material hardness of the thermoplastic polymer.

In one embodiment, the four-part thermoplastic blend has a material hardness greater than about 20 Shore D and up to about 70 Shore D.

In one embodiment, the at least one layer is a cover layer that surrounds a subassembly and has a hardness H that differs from a hardness $H_{(ii)}$ of (ii) by at least about 5 Shore D hardness points; wherein (ii) has a hardness of from about 20 Shore D to about 70 Shore D.

In another embodiment, the at least one layer is an inner cover layer that surrounds a subassembly and is surrounded by an outer cover layer and has a hardness H that differs from a hardness $H_{(ii)}$ of (ii) by at least about 5 Shore D hardness points; wherein (ii) has a hardness of from about 20 Shore D to about 70 Shore D.

In some embodiments, a golf ball of the invention comprises at least one layer consisting of a four-part thermoplastic blend consisting of: (i) at least one ionomer; (ii) at least one different thermoplastic polymer consisting of at least one thermoplastic polyurethane, thermoplastic urea, thermoplastic urea-urethane hybrid, or combination thereof; (iii) at least one reactive crosslinker consisting of maleic group-modified polymer(s), glycidyl (meth)acrylate-modified polymer(s), or combinations thereof ("PGM"); and (iv) at least one catalyst.

In particular embodiments, 20<T<50, or 20≤T≤50, or 20<T≤50, or 20<T<40, or 20≤T≤40, or 25≤T<50, or 25≤T≤50, or 25≤T<40, or 30≤T≤50, or 30≤T<40, or 40≤T≤50, or 40<T<50, or 15≤T≤50, or 15≤T≤30.

In different embodiments, T is from about 8 to 45, or 8≤T≤50, or 8<T<50, or 8<T≤50, or 8<T<50, or 8≤T≤40, or 8≤T<40, or 8<T≤40, or 8<T<40, or 8≤T≤30, or 8<T<30, or 8<T≤30, or 8<T<30, or 8≤T≤20, or 8≤T<20, or 8<T<20, or 8≤T≤20, or 8≤T<15, or 8<T<15, or 8<T≤15, or 8<T<15.

In specific formulations, 5≤C<35, or 10≤C<35, or 15≤C<35, or 15≤C≤35, or 15≤C<25, or 15≤C≤25, or 20≤C<35, or 20≤C≤35, or 20≤C<25, or 15≤C≤20.

In particular embodiments, 45<I<70, or 45<I≤70, or 45<I<60, or 45<I≤60, or 55≤I<70, or 55≤I≤70, or 45<I<90, or 45<I≤90, or 60<I<90, or 60<I≤90, or 70<I<90, or 70<I≤90.

Since I is always greater than 45, and 2≤C<35, T will always be at most about 50. This being said, many possible combinations of I, T and C may therefore be targeted and coordinated within the ranges disclosed herein. In one specific such example, I>45, C<35, and T>20. In another such specific embodiment, I>45, C<30, and T>25. In yet another such embodiment, I>45, C<20, and T>35. In still another such embodiment, I>45, C<15, and T>40. In a different embodiment, I>45, C≥2, and T≤53.

In one specific non-limiting example, I is 90, T is 8, and C is 2. In another specific non-limiting example, I is 80, T is 15, and C is 5. In yet another specific non-limiting example, I is 70, T is 20 and C is 10. In still another specific non-limiting example, I is 60, T is 25 and C is 15. In an alternative specific non-limiting example, I is 50, T is 30 and C is 20. In a different specific non-limiting example, I is 50, T is 20 and C is 30. In a different specific non-limiting example, I is 46, T is 50 and C is 4. In another specific non-limiting example, I is 45, T is 45 and C is 10. In yet another specific non-limiting example, I is 47, T is 43 and C is 10.

In some embodiments, a golf ball of the invention comprises at least one layer consisting of a four-part thermoplastic blend consisting of: (i) at least one ionomer; (ii) at least one different thermoplastic polymer consisting of at least one thermoplastic polyurethane, thermoplastic urea, thermoplastic urea-urethane hybrid, or combination thereof; (iii) at least one reactive crosslinker consisting of maleic group-modified polymer(s), glycidyl (meth)acrylate-modified polymer(s), or combinations thereof ("PGM"); and (iv) at least one catalyst. Once again, the four-part thermoplastic blend includes (i), (ii), and (iii) in a wt % ratio I:T:C; wherein I is the wt % of ionomer, T is the wt % of different thermoplastic polymer, and C is the wt % of PGM; and wherein I is >45 and 2≤C<35.

As used herein the term "thermoplastic polymer" refers to a thermoplastic composition including one or more thermoplastic polymers other than ionomer(s) as defined herein. In one such embodiment, the thermoplastic polymer may comprise a thermoplastic polyurethane, a thermoplastic urea, a thermoplastic urea-urethane hybrid, or combination(s) thereof. The thermoplastic polyurethane itself may include blends of thermoplastic urethanes/polyurethanes. The thermoplastic urea itself may include blends of thermoplastic ureas/polyureas. And the urea-urethane hybrid itself may include multiple differing hybrids.

The thermoplastic polymer of the four-part thermoplastic blend may additionally include/contain additional materials/ingredients such as fillers, additives, catalysts, wetting agents, coloring agents, optical brighteners, cross-linking agents, whitening agents such as titanium dioxide and zinc oxide, ultraviolet (UV) light absorbers, hindered amine light stabilizers, defoaming agents, processing aids, surfactants, and other conventional additives such as antioxidants, stabilizers, softening agents, plasticizers, impact modifiers, foaming agents, density-adjusting fillers, reinforcing materials, compatibilizers, and the like.

Interactions between each of the ionomer, the thermoplastic polymer, reactive crosslinker(s) (PGM) and catalyst(s) create a resulting thermoplastic material having superior mechanical strength, impact durability, and cut and scuff (groove shear)-resistance compared to the thermoplastic polymer alone and can better and more reliably sustain the great force and impact of a club face sticking the golf ball on the course. Incorporating the reactive crosslinker and catalyst in the four-part thermoplastic blend creates a resulting material having a structure that is interconnected via covalent bonds (chemical bonding) joining polymer chains together rather than being merely ionically bonded (having opposite ions which attract each other/an affinity toward each other).

The resulting four-part thermoplastic blend of the invention also may have a greater flexural modulus (ASTM D-790), tensile strength (ASTM D-638), and ultimate elongation (ASTM D-638) than the thermoplastic polymer of the four-part thermoplastic blend. The relative amounts of ionomer, thermoplastic polymer, reactive crosslinker(s) (PGM) and catalyst(s) can be changed, coordinated and targeted to achieve desired Tg, flexural modulus, tensile strength and/or ultimate elongation of the layer of four-part thermoplastic blend.

In one embodiment, the thermoplastic polymer may have a material hardness of from about 20 Shore D to about 66 Shore D, or from 20 Shore D to about 60 Shore D, or from 20 Shore D to about 50 Shore D, or from 20 Shore D to about 40 Shore D, or from 20 Shore D to about 30 Shore D, or from 30 Shore D to about 66 Shore D, or from 30 Shore D to about 60 Shore D, or from 30 Shore D to about 50 Shore D, or from 30 Shore D to about 40 Shore D, or from 40 Shore D to about 66 Shore D, or from 40 Shore D to about 60 Shore D, or from 40 Shore D to about 50 Shore D, or from 50 Shore D to about 66 Shore D, or from 50 Shore D to about 60 Shore D.

In one embodiment, the four-part thermoplastic blend has a material hardness greater than about 20 Shore D and up to about 70 Shore D, or greater than about 30 Shore D and up to about 70 Shore D, or greater than about 40 Shore D and up to about 70 Shore D, or greater than about 50 Shore D and up to about 70 Shore D, or greater than about 60 Shore D and up to about 70 Shore D, or from about 25 Shore D to about Shore 70 D, or from about 25 Shore D to about 60 Shore D, or from about 25 Shore D to about 50 Shore D, or from about 25 Shore D to about 40 Shore D, or from about 35 Shore D to about 70 Shore D, or from about 45 Shore D to about 60 Shore D, or from about 50 Shore D to about 70 Shore D, or from about 50 Shore D to about 60 Shore D.

The four-part thermoplastic blend may have a modulus that is greater than a modulus of the thermoplastic polymer. Thus, in such embodiments, it is envisioned that a layer of inventive four-part thermoplastic blend may have any known suitable modulus greater than the modulus of the thermoplastic polymer and predetermined by pre-selecting the relative amounts of ionomer, thermoplastic polymer, reactive crosslinker and catalysts in order to target a wide range of playing characteristics.

In order to produce a four-part thermoplastic blend possessing an producing unique and desirable golf ball properties without exhibiting the aforementioned problems encountered with conventional TPU-containing materials relating to durability, toughness, mechanical strength, cut and scuff resistance, the ionomer should be included in the four-part thermoplastic blend in an amount greater than 45 wt. % of the total weight of the blend. Meanwhile, the relative required amounts of components (ii) and (iii) of the four-part thermoplastic blend can be coordinated with each other as well as with respect to the pre-selected required amount of ionomer within the range of greater than 45 wt. % of the total weight of the blend. Thus, as long as the required amount of ionomer is greater than 45 wt. %, components (ii) (TPU) and (iii) of the four-part thermoplastic blend may be selected within the range of from 2 wt. % to less than 35 wt. %, and greater than 20 up to 50 wt. %, respectively, based on the total weight of the four-part thermoplastic blend.

There are specific embodiments wherein the required amount of ionomer included in the four-part thermoplastic blend may be greater than about 45 wt. % of the total weight of the blend while the required amount of component (iii) is up to about 35 wt. %, with the amount of component (ii) (TPU) being included within the range of from greater than 20 wt. % to up to about 50 wt. %.

A layer such as a cover containing the four-part thermoplastic blend may have a thickness of from about 0.010 inches to about 0.050 inches, or from about 0.010 inches to about 0.040 inches, or from about 0.010 inches to about 0.030 inches, or from about 0.010 inches to about 0.020 inches, or from about 0.015 inches to about 0.045 inches, or from about 0.025 inches to about 0.045 inches, or from about 0.035 inches to about 0.050 inches, or from about 0.020 inches to about 0.050 inches. It is also envisioned that coating layers and films of four-part thermoplastic blend may be formed about a subassembly in a golf ball of the invention in any known thickness thereof.

The invention also relates to a method of making a golf ball of the invention, comprising: providing a subassembly; and forming at least one layer about the subassembly consisting of a four-part thermoplastic blend consisting of: (i) at least one ionomer; (ii) at least one different thermoplastic polymer consisting of at least one thermoplastic polyurethane, thermoplastic urea, thermoplastic urea-urethane hybrid, or a combination thereof; (iii) at least one reactive crosslinker consisting of maleic group-modified polymer(s), glycidyl (meth)acrylate-modified polymer(s), or combinations thereof ("PGM"); and (iv) at least one catalyst. The four-part thermoplastic blend includes (i), (ii), and (iii) in a wt % ratio I:T:C; wherein I is the wt % of ionomer, T is the wt % of different thermoplastic polymer, and C is the wt % of PGM; and wherein I is >45 and 2≤C<35.

In another embodiment, the method of making a golf ball of the invention, comprises: providing a subassembly; and forming at least one layer about the subassembly comprising a four-part thermoplastic blend consisting of: (i) at least one ionomer; (ii) at least one different thermoplastic polymer consisting of at least one thermoplastic polyurethane, thermoplastic urea, thermoplastic urea-urethane hybrid, or a combination thereof; (iii) at least one reactive crosslinker consisting of maleic group-modified polymer(s), glycidyl (meth)acrylate-modified polymer(s), or combinations thereof ("PGM"); and (iv) at least one catalyst.

In other embodiments, the method comprises providing a subassembly consisting of a four-part thermoplastic blend consisting of: (i) at least one ionomer; (ii) at least one different thermoplastic polymer consisting of at least one thermoplastic polyurethane, thermoplastic urea, thermoplastic urea-urethane hybrid, or a combination thereof; (iii) at least one reactive crosslinker consisting of maleic group-modified polymer(s), glycidyl (meth)acrylate-modified polymer(s), or combinations thereof ("PGM"); and (iv) at least one catalyst; and forming at least one layer comprising a thermoset or thermoplastic composition about the subassembly.

Alternatively, the method may comprise providing a subassembly comprising a four-part thermoplastic blend consisting of: (i) at least one ionomer; (ii) at least one different thermoplastic polymer consisting of at least one thermoplastic polyurethane, thermoplastic urea, thermoplastic urea-urethane hybrid, or a combination thereof; (iii) at least one reactive crosslinker consisting of maleic group-modified polymer(s), glycidyl (meth)acrylate-modified polymer(s), or combinations thereof ("PGM"); and (iv) at least one catalyst; and forming at least one layer comprising a thermoset or thermoplastic composition about the subassembly.

The ionomer of a four-part thermoplastic blend may include partially-neutralized ionomers and highly-neutralized ionomers (HNPs), including ionomers formed from blends of two or more partially-neutralized ionomers, blends of two or more highly-neutralized ionomers, and blends of one or more partially-neutralized ionomers with one or more highly-neutralized ionomers.

Ionomers, typically are ethylene/acrylic acid copolymers or ethylene/acrylic acid/acrylate terpolymers in which some or all of the acid groups are neutralized with metal cations. Commercially available ionomers suitable for use with the present invention include for example SURLYNs® from DuPont and Ioteks® from Exxon. SURLYN® 8940 (Na), SURLYN® 9650 (Zn), and SURLYN® 9910 (Zn) are examples of low acid ionomer resins with the acid groups that have been neutralized to a certain degree with a cation. More examples of suitable low acid ionomers, e.g., Escor® 4000/7030 and Escor® 900/8000, are disclosed in U.S. Pat. Nos. 4,911,451 and 4,884,814, the disclosures of which are incorporated by reference herein. High acid ionomer resins include SURLYN® 8140 (Na) and SURLYN® 8546 (Li), which have an methacrylic acid content of about 19 percent. The acid groups of these high acid ionomer resins that have been neutralized to a certain degree with the designated cation.

Ionomers may encompass those polymers obtained by copolymerization of an acidic or basic monomer, such as alkyl (meth)acrylate, with at least one other comonomer, such as an olefin, styrene or vinyl acetate, followed by at least partial neutralization. Alternatively, acidic or basic groups may be incorporated into a polymer to form an ionomer by reacting the polymer, such as polystyrene or a polystyrene copolymer including a block copolymer of polystyrene, with a functionality reagent, such as a carboxylic acid or sulfonic acid, followed by at least partial neutralization. Suitable neutralizing sources include cations for negatively charged acidic groups and anions for positively charged basic groups.

For example, ionomers may be obtained by providing a cross metallic bond to polymers of monoolefin with at least one member selected from the group consisting of unsaturated mono- or di-carboxylic acids having 3 to 12 carbon atoms and esters thereof (the polymer contains about 1 percent to about 50 percent by weight of the unsaturated mono- or di-carboxylic acid and/or ester thereof). In one embodiment, the ionomer is an E/X/Y copolymers where E is ethylene, X is a softening comonomer, such as acrylate or methacrylate, present in 0 percent to about 50 percent by weight of the polymer (preferably 0 weight percent to about 25 weight percent, most preferably 0 weight percent to about 20 weight percent), and Y is acrylic or methacrylic acid present in about 5 to about 35 weight percent of the polymer, wherein the acid moiety is neutralized about 1 percent to about 100 percent (preferably at least about 40 percent, most preferably at least about 60 percent) to form an ionomer by a cation such as lithium, sodium, potassium, magnesium, calcium, barium, lead, tin, zinc, or aluminum, or a combination of such cations.

Any of the acid-containing ethylene copolymers discussed above may be used to form an ionomer according to the present invention. In addition, the ionomer may be a low acid or high acid ionomer. As detailed above, a high acid ionomer may be a copolymer of an olefin, e.g., ethylene, and at least 16 weight percent of an α,β-ethylenically unsaturated carboxylic acid, e.g., acrylic or methacrylic acid, wherein about 10 percent to about 100 percent of the carboxylic acid groups are neutralized with a metal ion. In contrast, a low acid ionomer contains about 15 weight percent of the α,β-ethylenically unsaturated carboxylic acid.

Suitable commercially available ionomer resins include SURLYNs® (DuPont) and Ioteks® (Exxon). Other suitable ionomers for use in the blends of the present invention include polyolefins, polyesters, polystyrenes, SBS, SEBS, and polyurethanes, in the form of homopolymers, copolymers, or block copolymer ionomers.

The ionomers may also be blended with highly neutralized polymers (HNP). As used herein, a highly neutralized polymer has greater than about 70 percent of the acid groups neutralized. In one embodiment, about 80 percent or greater of the acid groups are neutralized. In another embodiment, about 90 percent or greater of the acid groups are neutralized. In still another embodiment, the HNP is a fully neutralized polymers, i.e., all of the acid groups (100 percent) in the polymer composition are neutralized.

Suitable HNPs include, but are not limited to, polymers containing α,β-unsaturated carboxylic acid groups, or the salts thereof, that have been highly neutralized by organic fatty acids. Such HNPs are commercially available from DuPont under the trade name HPF, e.g., HPF 1000 and HPF 2000. The HNP can also be formed using an oxa-containing compound as a reactive processing aid to avoid processing problems, as disclosed in U.S. Patent Publication No. 2003/0225197. In particular, an HNP can include a thermoplastic resin component having an acid or ionic group, i.e., an acid polymer or partially neutralized polymer, combined with an oxa acid, an oxa salt, an oxa ester, or combination thereof and an inorganic metal compound or organic amine compound. As used herein, a partially neutralized polymer should be understood to mean polymers with about 10 to about 70 percent of the acid groups neutralized. For example, the HNP can include about 10 percent to about 30 percent by weight of at least one oxa acid, about 70 percent to about 90 percent by weight of at least one thermoplastic resin component, and about 2 percent to about 6 percent by weight of an inorganic metal compound, organic amine, or a combination thereof.

In addition, the HNP can be formed from an acid copolymer that is neutralized by one or more amine-based or an ammonium-based components, or mixtures thereof, as disclosed in co-pending U.S. patent application Ser. No. 10/875,725, filed Jun. 25, 2004, entitled "Golf Ball Compositions Neutralized with Ammonium-Based and Amine-Based Compounds," which is incorporated in its entirety by reference herein.

Furthermore, those of ordinary skill in the art will appreciate that the HNPs may be neutralized using one or more of the above methods. For example, an acid copolymer that is partially or highly neutralized in a manner described above may be subjected to additional neutralization using more traditional processes, e.g., neutralization with salts of organic fatty acids and/or a suitable cation source.

In a particular embodiment, the core includes at least one additional thermoplastic intermediate core layer formed from a composition comprising an ionomer selected from DuPont® HPF ESX 367, HPF 1000, HPF 2000, HPF AD1035, HPF AD1035 Soft, HPF AD1040, and AD1172 ionomers, commercially available from E. I. du Pont de Nemours and Company. The coefficient of restitution ("COR"), compression, and surface hardness of each of these materials, as measured on 1.55" injection molded spheres aged two weeks at 23° C./50% RH, are given in Table 1 below.

TABLE 1

| Example | Solid Sphere COR | Solid Sphere Compression | Solid Sphere Shore D Surface Hardness |
|---|---|---|---|
| HPF 1000 | 0.830 | 115 | 54 |
| HPF 2000 | 0.860 | 90 | 47 |
| HPF AD1035 | 0.820 | 63 | 42 |
| HPF AD1035 Soft | 0.780 | 33 | 35 |
| HPF AD1040 | 0.855 | 135 | 60 |
| HPF AD1172 | 0.800 | 32 | 37 |

In one embodiment, an intermediate layer is disposed between the single or multi-layered core and surrounding cover layer. These intermediate layers also can be referred to as casing or inner cover layers. The intermediate layer can be formed from any materials known in the art, including thermoplastic and thermosetting materials, but preferably is formed of an ionomer composition comprising an ethylene acid copolymer containing acid groups that are at least partially neutralized. Suitable ethylene acid copolymers that may be used to form the intermediate layers are generally referred to as copolymers of ethylene; $C_3$ to $C_8$ α, β-ethylenically unsaturated mono- or dicarboxylic acid; and optional softening monomer. These ethylene acid copolymer ionomers also can be used to form the inner core and outer core layers as described above.

Suitable ionomer compositions include partially-neutralized ionomers and highly-neutralized ionomers (HNPs), including ionomers formed from blends of two or more partially-neutralized ionomers, blends of two or more highly-neutralized ionomers, and blends of one or more partially-neutralized ionomers with one or more highly-neutralized ionomers. For purposes of the present disclosure, "HNP" refers to an acid copolymer after at least 70% of all acid groups present in the composition are neutralized. Preferred ionomers are salts of O/X- and O/X/Y-type acid copolymers, wherein O is an α-olefin, X is a $C_3$-$C_8$ α,β-ethylenically unsaturated carboxylic acid, and Y is a softening monomer. O is preferably selected from ethylene and propylene. X is preferably selected from methacrylic acid, acrylic acid, ethacrylic acid, crotonic acid, and itaconic acid. Methacrylic acid and acrylic acid are particularly preferred. Y is preferably selected from (meth) acrylate and alkyl (meth) acrylates wherein the alkyl groups have from 1 to 8 carbon atoms, including, but not limited to, n-butyl (meth) acrylate, isobutyl (meth) acrylate, methyl (meth) acrylate, and ethyl (meth) acrylate.

Preferred O/X and O/X/Y-type copolymers include, without limitation, ethylene acid copolymers, such as ethylene/(meth)acrylic acid, ethylene/(meth)acrylic acid/maleic anhydride, ethylene/(meth)acrylic acid/maleic acid mono-ester, ethylene/maleic acid, ethylene/maleic acid mono-ester, ethylene/(meth)acrylic acid/n-butyl (meth)acrylate, ethylene/(meth)acrylic acid/iso-butyl (meth)acrylate, ethylene/(meth)acrylic acid/methyl (meth)acrylate, ethylene/(meth) acrylic acid/ethyl (meth)acrylate terpolymers, and the like. The term, "copolymer," as used herein, includes polymers having two types of monomers, those having three types of monomers, and those having more than three types of monomers. Preferred α, β-ethylenically unsaturated mono- or dicarboxylic acids are (meth) acrylic acid, ethacrylic acid, maleic acid, crotonic acid, fumaric acid, itaconic acid. (Meth) acrylic acid is most preferred. As used herein, "(meth) acrylic acid" means methacrylic acid and/or acrylic acid. Likewise, "(meth) acrylate" means methacrylate and/or acrylate.

In a particularly preferred version, highly neutralized E/X- and E/X/Y-type acid copolymers, wherein E is ethylene, X is a $C_3$-$C_8$ α,β-ethylenically unsaturated carboxylic acid, and Y is a softening monomer are used. X is preferably selected from methacrylic acid, acrylic acid, ethacrylic acid, crotonic acid, and itaconic acid. Methacrylic acid and acrylic acid are particularly preferred. Y is preferably an acrylate selected from alkyl acrylates and aryl acrylates and preferably selected from (meth) acrylate and alkyl (meth) acrylates wherein the alkyl groups have from 1 to 8 carbon atoms, including, but not limited to, n-butyl (meth) acrylate, isobutyl (meth) acrylate, methyl (meth) acrylate, and ethyl (meth) acrylate. Preferred E/X/Y-type copolymers are those wherein X is (meth) acrylic acid and/or Y is selected from (meth) acrylate, n-butyl (meth) acrylate, isobutyl (meth) acrylate, methyl (meth) acrylate, and ethyl (meth) acrylate. More preferred E/X/Y-type copolymers are ethylene/(meth) acrylic acid/n-butyl acrylate, ethylene/(meth) acrylic acid/ methyl acrylate, and ethylene/(meth) acrylic acid/ethyl acrylate.

The amount of ethylene in the acid copolymer is typically at least 15 wt. %, preferably at least 25 wt. %, more preferably least 40 wt. %, and even more preferably at least 60 wt. %, based on total weight of the copolymer. The amount of $C_3$ to $C_8$ α, β-ethylenically unsaturated mono- or dicarboxylic acid in the acid copolymer is typically from 1 wt. % to 35 wt. %, preferably from 5 wt. % to 30 wt. %, more preferably from 5 wt. % to 25 wt. %, and even more preferably from 10 wt. % to 20 wt. %, based on total weight of the copolymer. The amount of optional softening comonomer in the acid copolymer is typically from 0 wt. % to 50 wt. %, preferably from 5 wt. % to 40 wt. %, more preferably from 10 wt. % to 35 wt. %, and even more preferably from 20 wt. % to 30 wt. %, based on total weight of the copolymer. "Low acid" and "high acid" ionomeric polymers, as well as blends of such ionomers, may be used. In general, low acid ionomers are considered to be those containing 16 wt. % or less of acid moieties, whereas high acid ionomers are considered to be those containing greater than 16 wt. % of acid moieties.

The various O/X, E/X, O/X/Y, and E/X/Y-type copolymers are at least partially neutralized with a cation source, optionally in the presence of a high molecular weight organic acid, such as those disclosed in U.S. Pat. No. 6,756,436, the entire disclosure of which is hereby incorporated herein by reference. The acid copolymer can be reacted with the optional high molecular weight organic acid and the cation source simultaneously, or prior to the addition of the cation source. Suitable cation sources include, but are not limited to, metal ion sources, such as compounds of alkali metals, alkaline earth metals, transition metals, and rare earth elements; ammonium salts and monoamine salts; and combinations thereof. Preferred cation sources are compounds of magnesium, sodium, potassium, cesium, calcium, barium, manganese, copper, zinc, lead, tin, aluminum, nickel, chromium, lithium, and rare earth metals.

Meanwhile, the thermoplastic polymer of the inventive four-part thermoplastic blend may comprise at least one thermoplastic polyurethane, thermoplastic urea, thermoplastic urea-urethane hybrid, or combinations/blends thereof. In general, polyurethanes contain urethane linkages formed by reacting an isocyanate group (—N═C═O) with a hydroxyl group (OH). The polyurethanes are produced by the reaction of a multi-functional isocyanate (NCO—R—NCO) with a long-chain polyol having terminal hydroxyl groups (OH—OH) in the presence of a catalyst and other additives. The chain length of the polyurethane prepolymer is extended by reacting it with short-chain diols (OH—R'—OH). The resulting polyurethane has elastomeric properties because of its "hard" and "soft" segments, which are covalently bonded together. This phase separation occurs because the mainly non-polar, low melting soft segments are incompatible with the polar, high melting hard segments. The hard segments, which are formed by the reaction of the diisocyanate and low molecular weight chain-extending diol, are relatively stiff and immobile. The soft segments, which are formed by the reaction of the diisocyanate and long chain diol, are relatively flexible and mobile. Because the hard segments are covalently coupled to the soft segments, they inhibit plastic flow of the polymer chains, thus creating elastomeric resiliency.

By the term, "isocyanate compound" as used herein, it is meant any aliphatic or aromatic isocyanate containing two or more isocyanate functional groups. The isocyanate compounds can be monomers or monomeric units, because they can be polymerized to produce polymeric isocyanates containing two or more monomeric isocyanate repeat units. The isocyanate compound may have any suitable backbone chain structure including saturated or unsaturated, and linear, branched, or cyclic. By the term, "polyamine" as used herein, it is meant any aliphatic or aromatic compound containing two or more primary or secondary amine functional groups. The polyamine compound may have any suitable backbone chain structure including saturated or unsaturated, and linear, branched, or cyclic. The term "polyamine" may be used interchangeably with amine-terminated component. By the term, "polyol" as used herein, it is meant any aliphatic or aromatic compound containing two or more hydroxyl functional groups. The term "polyol" may be used interchangeably with hydroxy-terminated component.

Thermoplastic polyurethanes have minimal cross-linking; any bonding in the polymer network is primarily through hydrogen bonding or other physical mechanism. Because of their lower level of cross-linking, thermoplastic polyurethanes are relatively flexible. The cross-linking bonds in thermoplastic polyurethanes can be reversibly broken by increasing temperature such as during molding or extrusion. That is, the thermoplastic material softens when exposed to heat and returns to its original condition when cooled. On the other hand, thermoset polyurethanes become irreversibly set when they are cured. The cross-linking bonds are irreversibly set and are not broken when exposed to heat. Thus, thermoset polyurethanes, which typically have a high level of cross-linking, are relatively rigid.

Aromatic polyurethanes can be prepared in accordance with this invention and these materials are preferably formed by reacting an aromatic diisocyanate with a polyol. Suitable aromatic diisocyanates that may be used in accordance with this invention include, for example, toluene 2,4-diisocyanate (TDI), toluene 2,6-diisocyanate (TDI), 4,4'-methylene diphenyl diisocyanate (MDI), 2,4'-methylene diphenyl diisocyanate (MDI), polymeric methylene diphenyl diisocyanate (PMDI), p-phenylene diisocyanate (PPDI), m-phenylene diisocyanate (PDI), naphthalene 1,5-diisocynate (NDI), naphthalene 2,4-diisocyanate (NDI), p-xylene diisocyanate (XDI), and homopolymers and copolymers and blends thereof. The aromatic isocyanates are able to react with the hydroxyl or amine compounds and form a durable and tough polymer having a high melting point. The resulting polyurethane generally has good mechanical strength and cut/shear-resistance.

Aliphatic polyurethanes also can be prepared in accordance with this invention and these materials are preferably formed by reacting an aliphatic diisocyanate with a polyol. Suitable aliphatic diisocyanates that may be used in accordance with this invention include, for example, isophorone diisocyanate (IPDI), 1,6-hexamethylene diisocyanate (HDI), 4,4'-dicyclohexylmethane diisocyanate ("$H_{12}$ MDI"), meta-tetramethylxylyene diisocyanate (TMXDI), trans-cyclohexane diisocyanate (CHDI), and homopolymers and copolymers and blends thereof. Particularly suitable multi-functional isocyanates include trimers of HDI or $H_{12}$ MDI, oligomers, or other derivatives thereof. The resulting polyurethane generally has good light and thermal stability.

Any polyol available to one of ordinary skill in the art is suitable for use according to the invention. Exemplary polyols include, but are not limited to, polyether polyols, hydroxy-terminated polybutadiene (including partially/fully hydrogenated derivatives), polyester polyols, polycaprolactone polyols, and polycarbonate polyols. In one preferred embodiment, the polyol includes polyether polyol. Examples include, but are not limited to, polytetramethylene ether glycol (PTMEG) which is particularly preferred, polyethylene propylene glycol, polyoxypropylene glycol, and mixtures thereof. The hydrocarbon chain can have saturated or unsaturated bonds and substituted or unsubstituted aromatic and cyclic groups.

In another embodiment, polyester polyols are included in the polyurethane material. Suitable polyester polyols include, but are not limited to, polyethylene adipate glycol; polybutylene adipate glycol; polyethylene propylene adipate glycol; o-phthalate-1,6-hexanediol; poly(hexamethylene adipate) glycol; and mixtures thereof. The hydrocarbon chain can have saturated or unsaturated bonds, or substituted or unsubstituted aromatic and cyclic groups. In still another embodiment, polycaprolactone polyols are included in the materials of the invention. Suitable polycaprolactone polyols include, but are not limited to: 1,6-hexanediol-initiated polycaprolactone, diethylene glycol initiated polycaprolactone, trimethylol propane initiated polycaprolactone, neopentyl glycol initiated polycaprolactone, 1,4-butanediol-initiated polycaprolactone, and mixtures thereof. The hydrocarbon chain can have saturated or unsaturated bonds, or substituted or unsubstituted aromatic and cyclic groups. In yet another embodiment, polycarbonate polyols are included in the polyurethane material of the invention. Suitable polycarbonates include, but are not limited to, polyphthalate carbonate and poly(hexamethylene carbonate) glycol. The hydrocarbon chain can have saturated or unsaturated bonds, or substituted or unsubstituted aromatic and cyclic groups. In one embodiment, the molecular weight of the polyol is from about 200 to about 4000.

There are two basic techniques that can be used to make the polyurethanes: a) one-shot technique, and b) prepolymer technique. In the one-shot technique, the diisocyanate, polyol, and hydroxyl-terminated chain-extender (curing agent) are reacted in one step. On the other hand, the prepolymer technique involves a first reaction between the diisocyanate and polyol compounds to produce a polyurethane prepolymer, and a subsequent reaction between the prepolymer and hydroxyl-terminated chain-extender. As a result of the reaction between the isocyanate and polyol compounds, there will be some unreacted NCO groups in the polyurethane prepolymer. The prepolymer should have less than 14% unreacted NCO groups. Preferably, the prepolymer has no greater than 8.5% unreacted NCO groups, more preferably from 2.5% to 8%, and most preferably from 5.0% to 8.0% unreacted NCO groups. As the weight percent of unreacted isocyanate groups increases, the hardness of the composition also generally increases.

Either the one-shot or prepolymer method may be employed to produce the polyurethane compositions of the invention. In one embodiment, the one-shot method is used, wherein the isocyanate compound is added to a reaction vessel and then a curative mixture comprising the polyol and curing agent is added to the reaction vessel. The components are mixed together so that the molar ratio of isocyanate groups to hydroxyl groups is preferably in the range of about 1.00:1.00 to about 1.10:1.00. In a second embodiment, the prepolymer method is used. In general, the prepolymer technique is preferred because it provides better control of the chemical reaction. The prepolymer method provides a more homogeneous mixture resulting in a more consistent polymer composition. The one-shot method results in a mixture that is inhomogeneous (more random) and affords the manufacturer less control over the molecular structure of the resultant composition.

The polyurethane compositions can be formed by chain-extending the polyurethane prepolymer with a single chain-extender or blend of chain-extenders as described further below. As discussed above, the polyurethane prepolymer can be chain-extended by reacting it with a single chain-extender or blend of chain-extenders. In general, the prepolymer can be reacted with hydroxyl-terminated curing agents, amine-terminated curing agents, and mixtures thereof. The curing agents extend the chain length of the prepolymer and build-up its molecular weight. In general, thermoplastic polyurethane compositions are typically formed by reacting the isocyanate blend and polyols at a 1:1 stoichiometric ratio. Thermoset compositions, on the other hand, are cross-linked polymers and are typically produced from the reaction of the isocyanate blend and polyols at normally a 1.05:1 stoichiometric ratio A catalyst may be employed to promote the reaction between the isocyanate and polyol compounds for producing the prepolymer or between prepolymer and chain-extender during the chain-extending step. Preferably, the catalyst is added to the reactants before producing the prepolymer. Suitable catalysts include, but are not limited to, bismuth catalyst; zinc octoate;

stannous octoate; tin catalysts such as bis-butyltin dilaurate, bis-butyltin diacetate, stannous octoate; tin (II) chloride, tin (IV) chloride, bis-butyltin dimethoxide, dimethyl-bis[1-oxonedecyl)oxy]stannane, di-n-octyltin bis-isooctyl mercaptoacetate; amine catalysts such as triethylenediamine, triethylamine, and tributylamine; organic acids such as oleic acid and acetic acid; delayed catalysts; and mixtures thereof. The catalyst is preferably added in an amount sufficient to catalyze the reaction of the components in the reactive mixture. In one embodiment, the catalyst is present in an amount from about 0.001 percent to about 1 percent, and preferably 0.1 to 0.5 percent, by weight of the composition.

The hydroxyl chain-extending (curing) agents are preferably selected from the group consisting of ethylene glycol; diethylene glycol; polyethylene glycol; propylene glycol; 2-methyl-1,3-propanediol; 2-methyl-1,4-butanediol; monoethanolamine; diethanolamine; triethanolamine; monoisopropanolamine; diisopropanolamine; dipropylene glycol; polypropylene glycol; 1,2-butanediol; 1,3-butanediol; 1,4-butanediol; 2,3-butanediol; 2,3-dimethyl-2,3-butanediol; trimethylolpropane; cyclohexyldimethylol; triisopropanolamine; N,N,N',N'-tetra-(2-hydroxypropyl)-ethylene diamine; diethylene glycol bis-(aminopropyl) ether; 1,5-pentanediol; 1,6-hexanediol; 1,3-bis-(2-hydroxyethoxy) cyclohexane; 1,4-cyclohexyldimethylol; 1,3-bis-[2-(2-hydroxyethoxy) ethoxy]cyclohexane; 2, 2'-(1,4-phenylenedioxy)diethanol, 1,3-bis-{2-[2-(2-hydroxyethoxy) ethoxy]ethoxy}cyclohexane; trimethylolpropane; polytetramethylene ether glycol (PTMEG), preferably having a molecular weight from about 250 to about 3900; and mixtures thereof.

Suitable amine chain-extending (curing) agents that can be used in chain-extending the polyurethane prepolymer include, but are not limited to, unsaturated diamines such as 4,4'-diamino-diphenylmethane (i.e., 4,4'-methylene-dianiline or "MDA"), m-phenylenediamine, p-phenylenediamine, 1,2- or 1,4-bis(sec-butylamino)benzene, 3,5-diethyl-(2,4- or 2,6-) toluenediamine or "DETDA", 3,5-dimethylthio-(2,4- or 2,6-)toluenediamine, 3,5-diethylthio-(2,4- or 2,6-)toluenediamine, 3,3'-dimethyl-4,4'-diamino-diphenylmethane, 3,3'-diethyl-5,5'-dimethyl4,4'-diamino-diphenylmethane (i.e., 4,4'-methylene-bis(2-ethyl-6-methyl-benezeneamine)), 3,3'-dichloro-4,4'-diamino-diphenylmethane (i.e., 4,4'-methylene-bis(2-chloroaniline) or "MOCA"), 3,3',5,5'-tetraethyl-4,4'-diamino-diphenyl-methane (i.e., 4,4'-methylene-bis(2,6-diethylaniline), 2,2'-dichloro-3,3',5,5'-tetraethyl-4,4'-diamino-diphenylmethane (i.e., 4,4'-methylene-bis(3-chloro-2,6-diethyleneaniline) or "MCDEA"), 3,3'-diethyl-5,5'-dichloro-4,4'-diamino-diphenylmethane, or "MDEA"), 3,3'-dichloro-2,2',6,6'-tetraethyl-4,4'-diamino-diphenylmethane, 3,3'-dichloro-4,4'-diamino-diphenylmethane, 4,4'-methylene-bis(2,3-dichloroaniline) (i.e., 2,2',3,3'-tetrachloro-4,4'-diamino-diphenylmethane or "MDCA"); and mixtures thereof. One particularly suitable amine-terminated chain-extending agent is Ethacure 300™ (dimethylthiotoluenediamine or a mixture of 2,6-diamino-3,5-dimethylthiotoluene and 2,4-diamino-3,5-dimethylthiotoluene.) The amine curing agents used as chain extenders normally have a cyclic structure and a low molecular weight (250 or less).

When the polyurethane prepolymer is reacted with hydroxyl-terminated curing agents during the chain-extending step, as described above, the resulting polyurethane composition contains urethane linkages. On the other hand, when the polyurethane prepolymer is reacted with amine-terminated curing agents during the chain-extending step, any excess isocyanate groups in the prepolymer will react with the amine groups in the curing agent. The resulting polyurethane composition contains urethane and urea linkages and may be referred to as a polyurethane/urea hybrid. The concentration of urethane and urea linkages in the hybrid composition may vary. In general, the hybrid composition may contain a mixture of about 10 to 90% urethane and about 90 to 10% urea linkages.

More particularly, when the polyurethane prepolymer is reacted with hydroxyl-terminated curing agents during the chain-extending step, as described above, the resulting composition is essentially a pure polyurethane composition containing urethane linkages having the following general structure:

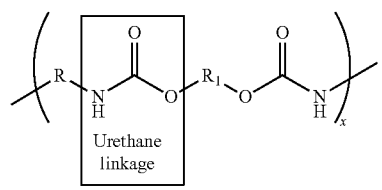
Urethane linkage where x is the chain length, i.e., about 1 or greater, and R and $R_1$ are straight chain or branched hydrocarbon chain having about 1 to about 20 carbons.

However, when the polyurethane prepolymer is reacted with an amine-terminated curing agent during the chain-extending step, any excess isocyanate groups in the prepolymer will react with the amine groups in the curing agent and create urea linkages having the following general structure:

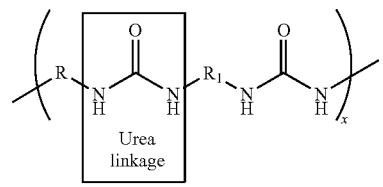
Urea linkage where x is the chain length, i.e., about 1 or greater, and R and $R_1$ are straight chain or branched hydrocarbon chain having about 1 to about 20 carbons.

The polyurethane compositions used to form the cover layer may contain other polymer materials including, for example: aliphatic or aromatic polyurethanes, aliphatic or aromatic polyureas, aliphatic or aromatic polyurethane/urea hybrids, olefin-based copolymer ionomer compositions, polyethylene, including, for example, low density polyethylene, linear low density polyethylene, and high density polyethylene; polypropylene; rubber-toughened olefin polymers; acid copolymers, for example, poly(meth)acrylic acid, which do not become part of an ionomeric copolymer; plastomers; flexomers; styrene/butadiene/styrene block copolymers; styrene/ethylene-butylene/styrene block copolymers; dynamically vulcanized elastomers; copolymers of ethylene and vinyl acetates; copolymers of ethylene and methyl acrylates; polyvinyl chloride resins; polyamides, poly(amide-ester) elastomers, and graft copolymers of ionomer and polyamide including, for example, Pebax® thermoplastic polyether block amides, available from Arkema Inc; cross-linked trans-polyisoprene and blends thereof; polyester-based thermoplastic elastomers, such as Hytrel®, available from DuPont; polyurethane-based thermoplastic elastomers, such as Elastollan®, available from BASF; polycarbonate/polyester blends such as Xylex®, available from SABIC Innovative Plastics; maleic anhydride-grafted polymers such as Fusabone®, available from DuPont; and mixtures of the foregoing materials.

In addition, the polyurethane compositions may contain fillers, additives, and other ingredients that do not detract from the properties of the final composition. These additional materials include, but are not limited to, catalysts, wetting agents, coloring agents, optical brighteners, cross-linking agents, whitening agents such as titanium dioxide and zinc oxide, ultraviolet (UV) light absorbers, hindered amine light stabilizers, defoaming agents, processing aids, surfactants, and other conventional additives. Other suitable additives include antioxidants, stabilizers, softening agents, plasticizers, including internal and external plasticizers, impact modifiers, foaming agents, density-adjusting fillers, reinforcing materials, compatibilizers, and the like. Some examples of useful fillers include zinc oxide, zinc sulfate, barium carbonate, barium sulfate, calcium oxide, calcium carbonate, clay, tungsten, tungsten carbide, silica, and mixtures thereof. Rubber regrind (recycled core material) and polymeric, ceramic, metal, and glass microspheres also may be used. Generally, the additives will be present in the composition in an amount between about 1 and about 70 weight percent based on total weight of the composition depending upon the desired properties.

Thermoplastic polyurea compositions are typically formed by reacting the isocyanate blend and polyamines at a 1:1 stoichiometric ratio. The polyurea prepolymer can be chain-extended by reacting it with a single curing agent or blend of curing agents. In general, the prepolymer can be reacted with hydroxyl-terminated curing agents, amine-terminated curing agents, or mixtures thereof. The curing agents extend the chain length of the prepolymer and build-up its molecular weight. Normally, the prepolymer and curing agent are mixed so the isocyanate groups and hydroxyl or amine groups are mixed at a 1.05:1.00 stoichiometric ratio.

A catalyst may be employed to promote the reaction between the isocyanate and polyamine compounds for producing the prepolymer or between prepolymer and curing agent during the chain-extending step. Preferably, the catalyst is added to the reactants before producing the prepolymer. Suitable catalysts include, but are not limited to, those identified above in connection with promoting the reaction between the isocyanate and polyol compounds for producing the prepolymer or between prepolymer and chain-extender during the chain-extending step.

The hydroxyl chain-extending (curing) agents are preferably selected from the same group identified above in connection with polyurethane compositions.

Suitable amine chain-extending (curing) agents that can be used in chain-extending the polyurea prepolymer of this invention include, but are not limited to those identified above in connection with chain-extending the polyurethane prepolymer, as well as 4,4'-bis(sec-butylamino)-diphenylmethane, N,N'-dialkylamino-diphenylmethane, trimethyleneglycol-di(p-aminobenzoate), polyethyleneglycol-di(p-aminobenzoate), polytetramethyleneglycol-di(p-aminobenzoate); saturated diamines such as ethylene diamine, 1,3-propylene diamine, 2-methyl-pentamethylene diamine, hexamethylene diamine, 2,2,4- and 2,4,4-trimethyl-1,6-hexane diamine, imino-bis(propylamine), imido-bis(propylamine), methylimino-bis(propylamine) (i.e., N-(3-aminopropyl)-N-methyl-1,3-propanediamine), 1,4-bis(3-aminopropoxy)butane (i.e., 3,3'-[1,4-butanediylbis-(oxy)bis]-1-propanamine), diethyleneglycol-bis(propylamine) (i.e., diethyleneglycol-di(aminopropyl)ether), 4,7,10-trioxatridecane-1,13-diamine, 1-methyl-2,6-diamino-cyclohexane, 1,4-diamino-cyclohexane, poly(oxyethylene-oxy-propylene) diamines, 1,3- or 1,4-bis(methylamino)-cyclohexane, isophorone diamine, 1,2- or 1,4-bis(sec-butylamino)-cyclohexane, N,N'-diisopropyl-isophorone diamine, 4,4'-diamino-dicyclohexylmethane, 3,3'-dimethyl-4,4'-diamino-dicyclohexylmethane, 3,3'-dichloro-4,4'-diamino-dicyclohexylmethane, N,N'-dialkylamino-dicyclohexylmethane, polyoxyethylene diamines, 3,3'-diethyl-5,5'-dimethyl-4,4'-diamino-dicyclohexylmethane, polyoxypropylene diamines, 3,3'-diethyl-5,5'-dichloro-4,4'-diamino-dicyclohexylmethane, polytetramethylene ether diamines, 3,3',5,5 '-tetraethyl-4,4'-diamino-dicyclohexylmethane (i.e., 4,4'-methylene-bis(2,6-diethylaminocyclohexane)), 3,3'-dichloro-4,4'-diamino-dicyclohexylmethane, 2,2'-dichloro-3,3',5,5'-tetraethyl-4,4'-diamino-dicyclohexylmethane, (ethylene oxide)-capped polyoxypropylene ether diamines, 2,2',3,3'-tetrachloro-4,4'-diamino-dicyclohexylmethane, 4,4'-bis(sec-butylamino)-dicyclohexylmethane; triamines such as diethylene triamine, dipropylene triamine, (propylene oxide)-based triamines (i.e., polyoxypropylene triamines), N-(2-aminoethyl)-1,3-propylenediamine (i.e., $N_3$-amine), glycerin-based triamines, (all saturated); tetramines such as N,N'-bis(3-aminopropyl)ethylene diamine (i.e., $N_4$-amine) (both saturated), triethylene tetramine; and other polyamines such as tetraethylene pentamine (also saturated).

When the polyurea prepolymer is reacted with amine-terminated curing agents during the chain-extending step, as described above, the resulting composition is essentially a pure polyurea composition. On the other hand, when the polyurea prepolymer is reacted with a hydroxyl-terminated curing agent during the chain-extending step, any excess isocyanate groups in the prepolymer will react with the hydroxyl groups in the curing agent and create urethane linkages to form a polyurea-urethane hybrid. Herein, the terms urea and polyurea are used interchangeably.

This chain-extending step, which occurs when the polyurea prepolymer is reacted with hydroxyl curing agents, amine curing agents, or mixtures thereof, builds-up the molecular weight and extends the chain length of the prepolymer. When the polyurea prepolymer is reacted with amine curing agents, a polyurea composition having urea linkages is produced. When the polyurea prepolymer is reacted with hydroxyl curing agents, a polyurea/urethane hybrid composition containing both urea and urethane linkages is produced. The polyurea/urethane hybrid composition is distinct from the pure polyurea composition. The concentration of urea and urethane linkages in the hybrid composition may vary. In general, the hybrid composition may contain a mixture of about 10 to 90% urea and about 90 to 10% urethane linkages. The resulting polyurea or polyurea/urethane hybrid composition has elastomeric properties based on phase separation of the soft and hard segments. The soft segments, which are formed from the polyamine reactants, are generally flexible and mobile, while the hard segments, which are formed from the isocyanates and chain extenders, are generally stiff and immobile.

The acid anhydride-modified polyolefin polymers used in a four-part thermoplastic blend of this invention may include copolymers such as, for example, ethylene-based copolymers, particularly ethylene-propylene (EP); ethylene-butene (EB); ethylene-hexene (EH); ethylene-octene (EO); styrene-ethylene/butylene-styrene (SEBS); ethylene-propylene diene monomer (EPDM); ethylene-vinyl acetate (EVA); and various ethylene-alkyl acrylate and ethylene-alkyl alkyl acrylate copolymers such as, for example, ethylene-methyl acrylate (EMA); ethylene-ethyl acrylate (EEA); ethylene-propyl acrylate (EPA); ethylene n-butyl acrylate (EBA) copolymers; and the like.

Other polyolefin-based copolymers such as polypropylene and polybutene-based copolymers also can be used. These copolymers include random, block, and graft copolymers which have been functionalized with acid anhydride groups.

The acid anhydride-modified polyolefin polymers can be prepared using techniques known in the art. For example, polyolefin copolymers, which are formed using metallocene single-site catalysts (or other single-site catalysts), can be used. These polyolefin copolymers can be formed by copolymerizing ethylene (or other olefin monomeric unit) with a functionalized comonomer(s) such as propene, butene, hexene, or octene containing acid anhydride groups under high pressure in the presence of metallocene or other single-site catalysts. In other instances, the ethylene (or other comonomeric unit) containing the acid anhydride groups may be grafted onto a metallocene catalyzed polyolefin polymers such as polypropylene, polyethylene, or polybutylene; or olefin copolymers of propylene, butylene, hexylene, heptylene, octylene and the like.

Different grafting techniques known in the art for synthesizing grafted copolymers can be used. Examples of metallocene catalysts include ferrocene, cobaltocene, nickelocene, titanocene dichloride, and zirconocene dichloride. These metallocene catalyzed polymers have some advantages over non metallocene-catalyzed polymers including a more narrowly defined molecular weight distribution and more uniform molecular architecture.

Examples of commercially-available acid anhydride polyolefins that can be used in accordance with this invention, include, but are not limited to, Amplify™ GR functional polymers, available from the Dow Chemical Company; Fusabond® polymers, available from the DuPont Company; Kraton® FG and RP polymers, available from Kraton Polymers LLC; Lotader® polymers available from Arkema, Inc.; Polybond® and Royaltuf® polymers, available from Chemtura Corp.; and Exxelor polymers available from the ExxonMobil Corp. Table 2 of U.S. Pat. No. 9,409,057 include properties of suitable PGMs and is hereby incorporated by reference herein in its entirety.

Functionalized polymers, other than the above-described acid anhydride-modified polyolefins, can be used in the compositions of this invention. The term, "functionalized polymers," refers to polymers comprising at least one (preferably olefin) monomer, and may further include co-monomers including (meth)acrylate esters, styrenes, and dienes. The polymer or copolymer is typically functionalized by reactively grafting a structurally distinct side chain onto the main polymer chain, but may in some cases be a product of copolymerization with the co-monomers.

Examples of grafted species include, but are not limited to, unsaturated alkyl diacids and anhydrides such as maleic, fumaric, and itaconic acids and anhydrides as well as their esters, (meth)acrylic acids and (meth)acrylate esters (including glycidyl methacrylates), The grafted species will most often contain a polar functional group.

Desirable polar groups in the grafted species include, but are not limited to, carboxylic acids, carboxylic acid anhydrides, glycidyls, glycidyl ethers, epoxies, amines, amides, sulfates, sulfonates, sulfonamides, oxazolines, phosphates, halogens, thiols, and hydroxyls.

The ionomer, thermoplastic polymer, at least one reactive crosslinker consisting of maleic group-modified polymer(s), glycidyl (meth)acrylate-modified polymer(s), or combinations thereof; and at least one catalyst may be mixed or otherwise combined and molded using any method known to one of ordinary skill in the art. In this regard, these ingredients can be added into a master batch simultaneously or sequentially, prior to molding. Alternatively, one or more of these ingredients may be combined first, and then added to the remaining ingredient(s). Compression and injection-molding, retractable pin injection-molding (RPIM) methods, reaction injection-molding (RIM), liquid injection-molding, casting, and the like may be used. Embodiments are also envisioned wherein the layer of four-part thermoplastic blend is formed about a subassembly by spraying, powder-coating, vacuum-forming, flow-coating, dipping, and/or spin-coating.

Many desirable golf ball constructions are possible incorporating at least one layer of four-part thermoplastic blend having property gradients within the at least one layer and between that layer and adjacent and nonadjacent layers.

Property gradients can be created within the at least one layer. For example, when the at least one layer is a layer surrounding a spherically-shaped subassembly, the at least one layer can have an inner surface hardness that differs from an outer surface hardness by up to about 30 Shore A hardness points. In one such embodiment, the inner surface hardness and outer surface hardness may differ by up to about 5 Shore A hardness points. In another embodiment, the inner surface hardness and outer surface hardness may differ by up to about 10 Shore A hardness points. In yet another embodiment, the inner surface hardness and outer surface hardness may differ by up to about 15 Shore A hardness points. In still another embodiment, the inner surface hardness and outer surface hardness may differ by up to about 20 Shore A hardness points. In other embodiments, the inner surface hardness and outer surface hardness may differ by between 2 and 10 Shore A hardness points, or between 2 and 10 Shore A hardness points, or between 2 and 10 Shore A hardness points, or between 5 and 15 Shore A hardness points, or between 10 and 20 Shore A hardness points, or between 15 and 25 Shore A hardness points, or from 20 to about 30 Shore A hardness points.

In such embodiments, the subassembly may have a geometric center hardness and a subassembly outer surface hardness that differ by up to 5 Shore C hardness points, or by up to 15 Shore C hardness points, or from 10 to about 30 Shore C hardness points.

Meanwhile, the outer surface hardness and subassembly outer surface hardness may differ by up to Shore D hardness points, or up to 10 Shore D hardness points, or from about 5 to about 10 shore D hardness points, or from 5 Shore D to about 15 Shore D hardness points, or from about 10 shore D to about 25 Shore D hardness points, or from 20 shore D hardness points to about 35 Shore D hardness points, or by from about 30 Shore D to about 50 Shore D hardness points, or by 40 to about 55 Shore D hardness points.

In some embodiments, the outer surface may have a Shore D hardness of from 20 to 70 and the geometric center has a Shore A hardness of from 65 to 100. In other embodiments, the outer surface may have a Shore A hardness of from 65 to 100 and the geometric center has a Shore D hardness of from 20 to 70. In one alternative embodiment, the outer surface may have a Shore A hardness of from 75 to 100 and the geometric center may have a Shore D hardness of from 20 to 40. In another alternative embodiment, the outer surface may have a Shore A hardness of from 75 to 100 and the geometric center may have a Shore D hardness of from 20 to 40. In yet another alternative embodiment, the outer surface may have a Shore A hardness of from 85 to 100 and the geometric center may have a Shore D hardness of from 40 to 60. In still another alternative embodiment, the outer surface may have a Shore A hardness of from 90 to 100 and the geometric center may have a Shore D hardness of from 50 to 70.

In embodiments wherein the four-part thermoplastic blend is a spherical core component of the golf ball, the core may have a material hardness of from about 20 Shore D to about 70 Shore D, or from about 40 Shore D to about 60 Shore D, or from about 20 Shore D to about 55 Shore D, or from about 20 Shore D to about 45 Shore D, or from about 35 Shore D to about 65 Shore D, or from about 55 Shore D to about 70 Shore D.

In other embodiments wherein the four-part thermoplastic blend is a spherical core component of the golf ball, the core may have a Shore A hardness of from about 60 to 100, or from about 65 to about 95, or from about 70 to about 90, or from about 65 to about 86, or from 75 to 100 or from 80 to 100, or from 90 to 100.

In one embodiment, the hardness of the four-part thermoplastic blend differs from a hardness of an outer surface of at least one other layer to define a negative or positive hardness gradient of up to Shore D hardness points. In another embodiment, the hardness of the four-part thermoplastic blend differs from a hardness of an outer surface of at least one other layer to define a negative or positive hardness gradient of between 1 and 5 Shore D hardness points. In yet another embodiment, the hardness of the four-part thermoplastic blend differs from a hardness of an outer surface of at least one other layer to define a negative or positive hardness gradient of greater than 5 and up to about 20 Shore D hardness points. In still another embodiment, the hardness of the four-part thermoplastic blend differs from a hardness of an outer surface of at least one other layer to define a negative or positive hardness gradient of greater than 20 and up to about 45 Shore D hardness points. In an alternative embodiment, the hardness of the four-part thermoplastic blend differs from a hardness of an outer surface of at least one other layer to define a negative or positive hardness gradient of greater than 25 and up to about 50 Shore D hardness points.

In alternative embodiments, a layer of four-part thermoplastic blend may be included in a golf ball of the invention as a single, solid core having a "positive" or "negative" hardness gradient, or as a "dual core," in which at least one of the inner core and outer core layer incorporates four-part thermoplastic material and has a positive or negative hardness gradient.

Examples of "positive" hardness gradient embodiments, wherein a single solid core includes the four-part thermoplastic blend, are as follows: the surface hardness of the core can range from 25 Shore D to 90 Shore D, or from 45 Shore D to 70 Shore D. In particular embodiments, the surface hardness be 68 Shore D, 60 Shore D, or 49 Shore D. The corresponding hardness of the center of the solid core may range from 30 Shore D to 80 Shore D, or from 40 Shore D to 65 Shore D, or in particular embodiments, be 61 Shore D, 52 Shore D, or 43 Shore D, respectively.

Examples of "negative" hardness gradient embodiments, wherein a single solid core includes four-part thermoplastic blend, are as follows: the surface hardness of the core can range from 20 Shore D to 80 Shore D, or from 35 Shore D to 60 Shore D, and in particular embodiments, the surface hardness may be 56 Shore D, 45 Shore D, or 40 Shore D. The corresponding center hardness may range from 30 Shore D to 75 Shore D, or from 40 Shore D to 65 Shore D, or in particular embodiments, be 61 Shore D, 52 Shore D, or 43 Shore D, respectively.

In a dual core "low spin" embodiment, the inner surface of the outer core layer is harder than the outer surface of the inner core. In a dual core "high spin" embodiment, the inner surface of the outer core layer is softer than the outer surface of the inner core.

Examples of "positive" hardness gradient embodiments, wherein at least one layer of the dual core includes four-part thermoplastic blend, are as follows: the outer core surface hardness may range from 25 Shore D to 90 Shore D, or from 45 Shore D to 70 Shore D, and in particular embodiments, be 68 Shore D, 61 Shore D, or 49 Shore D. The inner surface of the outer core may have a corresponding hardness of 61 Shore D, 61 Shore D, or 43 Shore D, respectively. The surface of the inner core can range from 40 Shore D to 65 Shore D, or in particular embodiments be 43 Shore D, 60 Shore D, or 49 Shore D, respectively. The center hardness of the inner core can range from 30 Shore D to 80 Shore D, or from 40 Shore D to 55 Shore D, in particular embodiments be 43 Shore D, 50 Shore D, or 43 Shore D, respectively.

Examples of "Negative" hardness gradient embodiments, wherein at least one layer of the dual core includes four-part thermoplastic blend, are as follows: the outer core surface hardness may range from 20 Shore D to 80 Shore D, or from 35 Shore D to 55 Shore D, or in particular embodiments, be 45 Shore D, 40 Shore D, or 52 Shore D. The inner surface of the outer core may have a corresponding hardness of 52 Shore D, 43 Shore D, or 52 Shore D, respectively. The surface of the inner core can range from 30 Shore D to 75 Shore D, or from 50 Shore D to 65 Shore D, or in particular embodiments be 61 Shore D, 52 Shore D, or 56 Shore D, respectively. The center hardness of the inner core can range from 50 Shore D to 65 Shore D, or in particular embodiments be 61 Shore D, 52 Shore D, or 61 Shore D, respectively. The "negative" gradient is steep.

In a "low spin" embodiment of the present invention, the hardness of an inner core (at any point—surface, center, or otherwise) including four-part thermoplastic blend may range from 30 Shore C to 80 Shore C, or from 40 Shore C to 75 Shore C, or from 45 Shore C to 70 Shore C. Concurrently, the hardness of the outer core layer (at any point—surface, inner surface, or otherwise) may range from 60 Shore C to 95 Shore C, or from 60 Shore C to 90 Shore C, or from 65 Shore C to 80 Shore C.

In a different "low spin" embodiment of the present invention, the hardness of an inner core (at any point—surface, center, or otherwise) including four-part thermoplastic blend may range from 30 Shore C to 80 Shore C, or from 40 Shore C to 75 Shore C, or from 45 Shore C to 70 Shore C. Concurrently, the hardness of the outer core layer (at any point—surface, inner surface, or otherwise) including four-part thermoplastic blend ranges from 60 Shore C to 95 Shore C, or from 60 Shore C to 90 Shore C, or from 65 Shore C to 80 Shore C.

In an alternative "low spin" embodiment of the present invention, the hardness of an inner core (at any point—surface, center, or otherwise) including four-part thermoplastic blend may range from 30 Shore C to 80 Shore C, or from 40 Shore C to 75 Shore C, or from 45 Shore C to 70 Shore C. Concurrently, the hardness of the outer core layer (at any point—surface, inner surface, or otherwise) including four-part thermoplastic blend may range from 60 Shore C to 95 Shore C, or from 60 Shore C to 90 Shore C, or from 65 Shore C to 80 Shore C.

In a "high spin" embodiment, the hardness of an inner core including four-part thermoplastic blend may range from 60 Shore C to 95 Shore C, or from 60 Shore C to 90 Shore C, or from 65 Shore C to 80 Shore C. Concurrently, the hardness of the outer core layer including four-part thermoplastic blend may range from 30 Shore C to 80 Shore C, or from 40 Shore C to 75 Shore C, or from 45 Shore C to 70 Shore C.

In a different "high spin" embodiment, the hardness of an inner core including four-part thermoplastic blend may range from 60 Shore C to 95 Shore C, or from 60 Shore C to 90 Shore C, or from 65 Shore C to 80 Shore C. Concurrently, the hardness of the outer core layer, including four-part thermoplastic blend, may range from 30 Shore C to 80 Shore C, or from 40 Shore C to 75 Shore C, or from 45 Shore C to 70 Shore C.

In an alternative "high spin" embodiment, the hardness of an inner core including four-part thermoplastic blend may range from 60 Shore C to 95 Shore C, or from 60 Shore C to 90 Shore C, or from 65 Shore C to 80 Shore C. Concurrently, the hardness of the outer core layer, including four-part thermoplastic blend, may range from 30 Shore C to 80 Shore C, or from 40 Shore C to 75 Shore C, or from 45 Shore C to 70 Shore C.

The property gradient may also be a percent (%) neutralization gradient that is created between an inner surface and outer surface of the at least one layer of four-part thermoplastic blend, or alternatively, gradually develops from outer surface toward inner surface of the at least one layer of four-part thermoplastic blend.

In different embodiments, at least one layer of the golf ball may comprise a tri-part thermoplastic blend consisting of: (i) at least one ionomer; (ii) at least one different thermoplastic polymer consisting of at least one thermoplastic polyurethane, thermoplastic urea, thermoplastic urea-urethane hybrid, or combination thereof; and (iii) a plurality of core-shell polymers; wherein at least one of a core and a shell of each core-shell polymer comprises one or more polymethyl (meth) acrylate-based copolymer. The thermoplastic blend includes (i), (ii), and (iii) in a wt % ratio I:T:C; wherein I is the wt % of ionomer, T is the wt % of different thermoplastic polymer, and C is the wt % of core-shell polymer; and wherein I is >45 and 2≤C<35.

Each core-shell polymer may have a diameter of from about 0.5 microns to about 20.0 microns. In a particular embodiment, each core-shell polymer has a diameter of from about 0.05 microns to about 0.20 micron.

In one embodiment, at least one core-shell polymer of the plurality has a urethane-containing core. In another embodiment, at least one core-shell polymer of the plurality has a non-urethane-containing core.

In another embodiment, at least one layer may comprise a tri-part thermoplastic blend consisting of: (i) at least one ionomer; (ii) at least one different thermoplastic polymer consisting of at least one thermoplastic polyurethane, thermoplastic urea, thermoplastic urea-urethane hybrid, or combination thereof; and (iii) at least one polymethyl (meth) acrylate-based copolymer. The tri-part thermoplastic blend includes (i), (ii), and (iii) in a wt % ratio I:T:C; wherein I is the wt % of ionomer, T is the wt % of different thermoplastic polymer, and C is the wt % of polymethyl (meth)acrylate-based copolymer; and wherein I is >45 and 2≤C<35.

In some embodiments, at least one layer may consist of a tri-part thermoplastic blend consisting of: (i) at least one ionomer; (ii) at least one different thermoplastic polymer consisting of at least one thermoplastic polyurethane, thermoplastic urea, thermoplastic urea-urethane hybrid, or combination thereof; and (iii) a plurality of core-shell polymers; wherein at least one of a core and a shell of each core-shell polymer comprises one or more polymethyl (meth)acrylate-based copolymer. And in other embodiments, at least one layer may consist of a tri-part thermoplastic blend consisting of: (i) at least one ionomer; (ii) at least one different thermoplastic polymer consisting of at least one thermoplastic polyurethane, thermoplastic urea, thermoplastic urea-urethane hybrid, or combination thereof; and (iii) at least one polymethyl (meth) acrylate-based copolymer.

In such embodiments, the polymethyl (meth)acrylate-based copolymer may be selected from the group consisting of polymethyl (meth)acrylate-based-n-butyl acrylate; polymethyl (meth)acrylate-based-ethyl acrylate; polymethyl (meth)acrylate-based-n-butyl acrylate-styrene; polymethyl (meth)acrylate-based-butadiene-styrene; polymethyl (meth) acrylate-based-acyrlonitrile-butadiene-styrene; polymethyl (meth)acrylate-based-ethylene-propylene-diene (EPDM); polymethyl (meth)acrylate-based-EPDM-styrene; polymethyl (meth)acrylate-based-glycidyl methacrylate-ethyl acrylate; polymethyl (meth)acrylate-based-glycidyl; (meth) acrylate-n-butyl acrylate; polymethyl (meth)acrylate-based-styrene-acrylonitrile; polymethyl (meth)acrylate-based-butadiene; and combinations thereof.

The polymethyl (meth)acrylate-based copolymer may comprise (meth)acrylates selected from the group consisting of: (meth)acrylates derived from saturated alcohols; (meth) acrylates derived from unsaturated alcohols; aryl(meth)acrylates; cycloalkyl(meth)acrylates; hydroxyalkyl(meth)acrylates; glycol di(methacrylates); (meth)acrylates of ether alcohols; amides of (meth)acrylic acid; nitriles of (meth) acrylic acid; sulfur-containing (meth)acrylates; polyfunctional (meth)acrylates; and combinations thereof.

The polymethyl (meth)acrylate-based copolymer may comprise acrylates selected from the group consisting of methyl acrylate, ethyl acrylate, propyl acrylate, iso-butyl acrylate, n-butyl acrylate, n-amyl acrylate, n-hexyl acrylate, isohexyl acrylates, n-heptyl acrylate, isoheptyl acrylates, capryl acrylate, (1-methylheptyl acrylate), n-octyl acrylate, ethylhexyl acrylate, isooctyl acrylates, methylheptyl acrylate, n-nonyl acrylate, isononyl acrylates, 3,5,5-trimethylhexyl acrylate, n-decyl acrylate, lauryl acrylate, n-amyl acrylate, n-hexyl acrylate, capryl acrylate (1-methylheptyl acrylate), n-octyl acrylate, isooctyl acrylates such as n-methylheptyl acrylate, 2-ethylhexyl acrylate, capryl acrylate.

The polymethyl (meth)acrylate-based copolymer may comprise a comonomer selected from the group consisting of: 1-alkenes; branched alkenes; acrylonitrile; styrenes; maleic acid derivatives; dienes; and combinations thereof.

The polymethyl (meth)acrylate-based copolymer may be selected from the group consisting of: alternating polymethyl (meth)acrylate-based copolymers, block polymethyl (meth)acrylate-based copolymers, random polymethyl (meth)acrylate-based copolymers, graft polymethyl (meth) acrylate-based copolymers, gradient polymethyl (meth) acrylate-based copolymers, and combinations thereof.

A thermoplastic polymer herein may further comprise acrylonitrile-butadiene-styrene terpolymer, acrylonitrile-styrene-acrylate, acrylonitrile-ethylene-styrene terpolymer, styrene acrylonitrile copolymer, styrene maleic anhydride copolymer, or combinations thereof.

A thermoplastic polymer herein may further comprise polycarbonate, maleic anhydride, grafted maleic anhydride, glycidyl methacrylate, modified polyolefins, modified styrene copolymers, or combinations thereof.

A thermoplastic polymer herein may include a modified styrene copolymer selected from the group consisting of poly(styrene-butadiene-styrene), poly(styrene-isoprene-styrene), poly(styrene-ethylene/butylene-styrene), and poly (styrene-ethylene/propylene-styrene).

In some embodiments, the three-part thermoplastic blend may have a glass transition temperature Tg-b that is greater than a glass transition temperature Tg-tp of the thermoplastic polymer.

As used herein, the term polymethyl methacrylate-based copolymer or MMA copolymer comprises poly(meth)acrylates, methacrylates, and acrylates. Polymethacrylates can be obtained using known methods such as via free-radical polymerization of (meth)acrylates. Herein, the terms (meth) acrylate and methacrylate are used interchangeably.

The term "alternating" means that the MMA copolymer is comprised of alternating sequences of different monomers in a roughly 1 to 1 ratio. The term "block" means that the MMA copolymer is comprised of relatively long sequences of one monomer followed by a relatively long sequence of a different monomer. The term "random" means that the MMA copolymer is comprised of two or more different repeating units of (2 or more) monomers are distributed randomly. The term "graft" means that the MMA copolymer is comprised of a main chain of one type of monomer with branches of another type of monomer. The term "gradient" means that the MMA copolymer exhibits a gradual change in composition along the chain from mostly one type of monomer at the start of a chain to mostly another type at the chain end. More specific variations within some of these groups include, for example, star, comb, and/or centipede configurations.

The thermoplastic polymer and MMA copolymer may be mixed and molded using any method known to one of ordinary skill in the art. In this regard, the MMA copolymer may be incorporated into a master batch which is then added to the thermoplastic polymer prior to molding. Alternatively, the thermoplastic polymer and MMA copolymer may be combined by at least one of high shear mixing, followed by molding. Compression and injection-molding, retractable pin injection-molding (RPIM) methods, reaction injection-molding (RIM), liquid injection-molding, casting, and the like may be used. Embodiments are also envisioned wherein the layer of inventive tri-part or four-part thermoplastic blend is formed about a subassembly by spraying, powder-coating, vacuum-forming, flow-coating, dipping, and/or spin-coating.

As used herein, the phrase "plurality of core-shell polymers" refers to the group or loading of core-shell polymers being combined with the ionomer and thermoplastic polymer to form the tri-part thermoplastic blend. In one embodiment, all core-shell polymers of a particular group or loading may be substantially similar both with respect to construction (shape/size) and composition. In other embodiments, at least two core-shell polymers of the group or loading may differ, such as having different core sizes/shapes and/or compositions and/or having differing shell sizes/shapes and/or compositions.

The loading of the plurality of core-shells can be adjusted to modify resulting layer properties such as material hardness, flexural modulus, tensile strength and target mechanical strength, impact durability, and shear-resistance and will depend at least in part on the particular properties of the specific thermoplastic polymer being combined therewith.

Each core-shell may have a diameter of from about 0.05 microns to about 20 microns. In one embodiment, each core-shell polymer may have a diameter of from about 0.5 microns to about 20.0 microns. In another embodiment, each core-shell polymer has a diameter of from about 0.05 microns to about 0.20 microns.

In one embodiment, at least one core-shell polymer of the plurality has a urethane-containing core. In another embodiment, at least one core-shell polymer of the plurality has a non-urethane-containing core.

The invention also relates to a method of making a golf ball of the invention, comprising: providing a subassembly; and forming at least one layer about the subassembly consisting of a tri-part thermoplastic blend of (i) ionomer(s); (ii) a thermoplastic polymer; and (iii) (a) a plurality of core-shell polymers; wherein at least one of a core and a shell of each core-shell polymer comprises one or more polymethyl (meth)acrylate-based copolymer; and/or (b) at least one polymethyl (meth)acrylate-based copolymer; wherein the thermoplastic polymer comprises at least one thermoplastic polyurethane, thermoplastic urea, thermoplastic urea-urethane hybrid, or combinations thereof.

In other embodiments, the method comprises providing a subassembly consisting of (i) ionomer(s); (ii) a thermoplastic polymer; and (iii)(a) a plurality of core-shell polymers; wherein at least one of a core and a shell of each core-shell polymer comprises one or more polymethyl (meth)acrylate-based copolymer; and/or (b) at least one polymethyl (meth) acrylate-based copolymer; wherein the thermoplastic polymer comprises at least one thermoplastic polyurethane, thermoplastic urea, thermoplastic urea-urethane hybrid, or combinations thereof; and forming at least one layer comprising a thermoset or thermoplastic composition about the subassembly.

Core-shell polymers can be prepared by methods such as dispersion, precipitation, and emulsion polymerization. See, e.g., "Core-shell polymers: a review", Ramli, Ros Azlinawati; Laftah, Waham Ashaier; Hashim, Shahrir; RSC Advances, 2013, 3, 15543-15565 (hereinafter referred to as "the core-shell polymer review article"), hereby incorporated by reference herein in its entirety.

Non-limiting examples of suitable core-shell polymers include RayAce®5525, RayCore®9534A, RayCore®9507A, RayCore®9506A, and RayCore®9021A, all commercially available from Specialty Polymers, Inc. RayAce®5525 core-shells are alkyd-acrylic core-shell hybrids having average particle sizes of 0.16 micron, and RayCore®9534A, RayCore®9507A, RayCore®9506A, and RayCore®9021A are urethane-acrylic core-shell hybrids having average particle sizes of 0.10 microns. Additional examples of core-shell constructions include those disclosed and described in U.S. Pat. No. 4,419,471 of Nelsen et al.; U.S. Pat. No. 4,666,777 of Ash et al.; U.S. Pat. No. 4,876,313 of Lorah; U.S. Pat. No. 5,006,592 of Oshima et al.; U.S. Pat. No. 5,183,858 of Sasaki et al.; U.S. Pat. No. 5,206,299 of Oshima et al.; U.S. Pat. No. 5,237,015 of Urban; U.S. Pat. No. 5,242,982 of Oshima et al.; U.S. Pat. No. 5,280,075 of Oshima et al.; U.S. Pat. No. 5,280,076 of Sasaki et al.; U.S. Pat. No. 5,290,858 of Sasaki et al.; U.S. Pat. No. 5,304,707 of Blankenship et al.; U.S. Pat. No. 5,324,780 of Oshima et al.; U.S. Pat. No. 5,362,804 of Oshima et al.; U.S. Pat. No. 5,403,894 of Tsai et al.; U.S. Pat. No. 5,453,458 of Takeuchi et al.; U.S. Pat. No. 6,777,500 of Lean et al.; and U.S. Pat. No. 6,858,301 of Ganapathiappan, each of which is hereby incorporated herein in its entirety.

Advantageously, the inventive tri-part thermoplastic blend may have a glass transition temperature Tg-m that is greater than a glass transition temperature Tg-tp of the thermoplastic polymer. In this regard, the term Glass Transition Temperature (Tg) refers to the temperature region where a polymer transitions from a hard, glassy material to a soft, rubbery material. It is always lower than the melting temperature of the crystalline state of the material, if one exists. Tg can be measured by MDSC, which is an enhancement to conventional DSC [DSC measures the temperatures and heat flows associated with transitions in materials as a function of temperature or time in a controlled atmosphere making a Differential Scanning calorimetry (DSC) determination using a DSC calorimeter NETZSCH, type 204].

MDSC separates the total heat flow into reversing (heat capacity) and non-reversing (kinetic) components. The reversing signal contains heat capacity events such as the glass transition and melting. The non-reversing signal contains kinetic events such as crystallization, crystal perfection and reorganization, cure, and decomposition. Instrumentation is also commercially available from TA Instruments.

In an inventive tri-part thermoplastic blend of the invention, interactions between the thermoplastic polymer, having a relatively lower Tg, and a plurality of core-shell polymers, having a relatively higher Tg, create a resulting thermoplastic material having improved mechanical strength, impact durability, and cut and scuff (groove shear)-resistance, compared to a layer of thermoplastic polymer alone, and can better and more reliably sustain the great force and impact of a club face sticking the golf ball on the course.

In this regard, TPU's generally have a Tg below 0° C. (32° F.), or −10° C. or less, or −30° C. or less, or −40° C. or less. Meanwhile the Tg of and poly(methyl methacrylate) is well above room temperature, at around 100 C (212° F.). Each core-shell polymer, containing poly(methyl methacrylate) in one of its core or shell and having a shell or core formed of a different material, will have a Tg greater than that of the thermoplastic polymer and generally less than about 100° C. (212° F.).

In one specific example, a RayAce®5525 alkyd-acrylic core-shell hybrid has a Tg of about 29° C. (84.2° F.). In another specific example, urethane-acrylic core-shell hybrids RayCore®9534A, RayCore®9507A, RayCore®9506A, and RayCore®9021A have Tg's of 30° C. (86° F.), 42° C. (107.2° F.), 39° C. (102.2° F.), and 17° C. (60.8° F.), respectively. Thus, where the thermoplastic polyurethane is mixed with these core-shell polymers, a layer can be produced having desirably superior mechanical strength, impact durability, and cut and scuff (groove shear)-resistance compared with the thermoplastic polyurethane.

In one embodiment, at least some of the core-shell polymers of the plurality will have a glass transition temperature Tg-cs that is greater than Tg-tp. In another embodiment, all of the core-shell polymers of the plurality will have a glass transition temperature Tg-cs that is greater than Tg-tp. In a particular embodiment, Tg-cs and Tg-tp differ by at least 25° C.

Non-limiting examples of suitable MMA-comprising polymers for incorporation in core-shell constructions also include Blendex® 338, Blendex® 362, and Blendex® 3160, and Royaltuf®960A, commercially available from Galata Chemicals, LLC.

In one embodiment, the resulting layer contains a heterogeneous tri-part thermoplastic blend wherein a plurality of core-shell polymers are located throughout the ionomer and thermoplastic polyurethane polymer. In another embodiment, the resulting layer contains a heterogeneous tri-part thermoplastic blend wherein a plurality of core-shell polymers are located throughout a thermoplastic polyurea polymer. In yet another embodiment, the resulting layer contains a heterogeneous tri-part thermoplastic blend wherein a plurality of core-shell polymers that are located throughout a thermoplastic polyurethane-polyurea polymer.

In any of these embodiments, the plurality may include a plurality of core-shells that are substantially similar or alternatively include two or more different core-shell types. For example, the plurality may include both urethane-acrylic core-shell hybrids and alkyd-acrylic core-shell hybrids. Or, the plurality may include all urethane-acrylic core-shell hybrids but which have differing shell thicknesses.

In embodiments wherein the at least one core-shell polymer of the plurality has a urethane-containing core, that core may in one embodiment be formed from the same polyurethane that the thermoplastic polymer of the tri-part thermoplastic blend is formed from. In other such embodiments, that core may be formed from a different polyurethane than the thermoplastic polymer of the tri-part thermoplastic blend is formed from.

In some embodiments, at least one core-shell polymer of the plurality has a non-urethane-containing core and it is envisioned that numerous non-urethane compositions known in the art may form the core. Meanwhile, in each core-shell polymer of the plurality, at least one of a core and/or shell comprises one or more polymethyl methacrylate (MMA) copolymers. Each core-shell polymer uniquely collectively contributes to the resulting tri-part thermoplastic blend properties not possessed by the core or shell individually, which when further combined with the thermoplastic polymer of the tri-part thermoplastic blend creates a resulting layer that is more durable and tough than the thermoplastic of the tri-part thermoplastic blend alone.

Interactions between each of the plurality of core-shell polymers and the thermoplastic polymer create a resulting thermoplastic material having superior mechanical strength, impact durability, and cut and scuff (groove shear)-resistance compared to the thermoplastic polymer alone and can better and more reliably sustain the great force and impact of a club face sticking the golf ball on the course.

The resulting tri-part thermoplastic blend of the invention also may have a greater flexural modulus (ASTM D-790), tensile strength (ASTM D-638), and ultimate elongation (ASTM D-638) than the thermoplastic polymer of the tri-part thermoplastic blend. The relative amounts of ionomer, thermoplastic polymer and plurality of core-shell polymers can be changed, coordinated and targeted to achieve desired Tg, flexural modulus, tensile strength and/or ultimate elongation of the layer of tri-part thermoplastic blend.

In this regard, the resulting inventive tri-part thermoplastic blend can have a low flexural modulus or a high flexural modulus, as long as the inventive tri-part thermoplastic blend flexural modulus is greater than the flexural modulus of the thermoplastic polymer of the tri-part thermoplastic blend. Thus, a layer of tri-part thermoplastic blend may for example have a flexural modulus within a range having a lower limit of about 300 psi or 1,000 psi or 5,000 psi or 10,000 psi and an upper limit of 15,000 or 20,000 or 25,000 or 30,000 or 35,000 or 45,000 or 50,000 or 55,000 psi. In these embodiments, the flexural modulus of the thermoplastic polymer of the tri-part thermoplastic blend may be at least 5% less, 10% less, or at least 20% less, or at least 25% less, or at least 30% less, or at least 35% less, than that of the inventive tri-part thermoplastic blend.

Alternatively, the resulting inventive tri-part thermoplastic blend may have a high flexural modulus within a range having a lower limit of about 25,000 or 30,000 or 35,000 or 40,000 or 45,000 or 50,000 or 55,000 or 60,000 psi and an upper limit of 70,000 or 75,000 or 100,000 or 150,000 psi. In such embodiments, the modulus of the thermoplastic polymer of the tri-part thermoplastic blend may be at least 5% less, 10% less, or at least 20% less, or at least 25% less, or at least 30% less, or at least 35% less, than that of the inventive tri-part thermoplastic blend.

Additionally, the resulting inventive tri-part thermoplastic blend can have a low tensile strength or a high tensile strength, as long as the inventive tri-part thermoplastic blend tensile strength is greater than the tensile strength of the thermoplastic polymer of the tri-part thermoplastic blend. In one non-limiting example, the tensile strength of the resulting layer may be greater than 4500 psi, or greater than 5500 psi, or at least 6500 psi, or at least 7500 psi, or at least 8500 psi, or at least 9500 psi.

Moreover, the resulting inventive tri-part thermoplastic blend can have a low ultimate elongation or a high ultimate elongation, as long as the inventive tri-part thermoplastic blend ultimate elongation is greater than the ultimate elongation of the thermoplastic polymer of the tri-part thermoplastic blend. For example, the ultimate elongation may be at least 25%, or at least 50%, or at least 100%, or at least 125%, or at least 150%, or at least 175%, or 200% or greater.

In some embodiments, the shell thickness of each core-shell polymer may be targeted to create core-shell polymers that remain structurally intact and well dispersed within the thermoplastic polymer during and/or after melt blending. In such embodiments, a shell that is too thin may not protect its core sufficiently during vigorous processing conditions which can result in the cores becoming partially exposed and connecting with each other to form a cellular-like structure, thereby producing poor toughening efficiency.

Meanwhile, if the shell of a core-shell polymer is too thick, insufficient elasticity may result in which case the core-shells become useful in the inventive tri-part thermoplastic blend as rigid fillers, rather than as an efficient impact modifier. Thus, regardless of the particle size, shell thickness of these core-shell polymer can be targeted in order to display high efficiency in toughening the resulting layer composition.

In one embodiment, a three-piece golf ball of the invention comprises a core, an intermediate layer and a cover layer, wherein the core is formed from a rubber composition, the intermediate layer is formed from an ionomeric composition, and the cover is formed from inventive tri-part thermoplastic blend. In one such embodiment, ionomer is selected from partially-neutralized ionomers and highly-neutralized ionomers (HNPs), including ionomers formed from blends of two or more partially-neutralized ionomers, blends of two or more highly-neutralized ionomers, and blends of one or more partially-neutralized ionomers with one or more highly-neutralized ionomers, the thermoplastic polymer of the tri-part thermoplastic blend is a thermoplastic polyurethane composition and each core-shell polymer of the plurality is a RayAce®5525 alkyd-acrylic core-shell hybrid. In an alternative embodiment, each core-shell polymer of the plurality is one of RayCore®9534A, RayCore®9507A, RayCore®9506A, and RayCore®9021A urethane-acrylic core-shell hybrids. In yet another embodiment, the plurality of core-shell polymers include both alkyd-acrylic core-shell hybrids and urethane-acrylic core-shell hybrids. In one embodiment at least one core of the of the core-shell polymers contain MMA while the shells are urethane. In another embodiment, at least one core of the core-shell polymers contains urethane while the shell contains MMA. In yet other embodiments at least one core-shell polymer of the plurality is non-urethane. The hardness of the resulting layer in each of these embodiments may be from about 20 Shore D to about 70 Shore D as long as the resulting tri-part thermoplastic blend has a hardness that is different that a hardness of the thermoplastic polymer of the tri-part thermoplastic blend and the modulus of the resulting tri-part thermoplastic blend is greater than a modulus of the thermoplastic polymer of the tri-part thermoplastic blend.

In different embodiments, the thermoplastic polymer of the inventive tri-part thermoplastic blend may consist of a thermoplastic polyurea composition. In alternative embodiments, the thermoplastic polymer of the inventive tri-part thermoplastic blend may consist of a thermoplastic polyurethane-polyurea hybrid composition. In each such different and alternative embodiments, the inventive tri-part thermoplastic blend may include core-shell polymers such as those suggested in embodiments wherein the thermoplastic polymer composition is a polyurethane.

While golf balls of the invention include the inventive tri-part thermoplastic blend in an outer cover layer, it is also envisioned that a different golf ball layer (inner core, outer core, intermediate layer, etc.) may alternatively or additionally incorporate the inventive tri-part thermoplastic blend of ionomer, thermoplastic polymer and plurality of core-shell polymers.

In contrast, when a mixture is made that does not include the ionomer component, the thermoplastic polymer (thermoplastic polyurethane, a thermoplastic urea, a thermoplastic urea-urethane hybrid, or combinations thereof) and plurality of core-shells and/or polymethyl methacrylate-based copolymer (MMA copolymer) may be included in the mixture in a weight ratio of from about 98:2 to about 50:50. In another embodiment, the thermoplastic polymer and the MMA copolymer may be included in the mixture in a weight ratio of from 95:5 to 55:45. In yet another embodiment, the thermoplastic polymer and the MMA copolymer may be included in the mixture in a weight ratio of from 93:7 to 65:35.

Golf balls having various constructions may be made in accordance with this invention. For example, golf balls having two piece, three piece, four-piece, and five-piece constructions with single or multi-layered cover materials may be made. Representative illustrations of such golf ball constructions are provided and discussed further below. The term, "layer" as used herein means generally any spherical of the golf ball. More particularly, in one version, a two-piece golf ball containing a core surrounded by a cover is made. Three-piece golf balls containing a dual-layered core and single-layered cover also can be made. The dual-core includes an inner core (center) and surrounding outer core layer. In another version, a four-piece golf ball containing a dual-core and dual-cover (inner cover and outer cover layers) is made. In yet another construction, a four-piece or five-piece golf ball containing a dual-core; casing layer(s); and cover layer(s) may be made. As used herein, the term, "casing layer" means a layer of the ball disposed between the multi-layered core sub-assembly and cover. The casing layer also may be referred to as a mantle or intermediate layer. The diameter and thickness of the different layers along with properties such as hardness and compression may vary depending upon the construction and desired playing performance properties of the golf ball as discussed further below.

Thus, golf balls of the invention may have any number of layers, including for example a four piece golf ball wherein the core is a dual core surrounded by an ionomeric inner cover layer wherein an outer cover layer of inventive tri-part thermoplastic blend is disposed about the inner cover layer. In such embodiments, it is envisioned that the inner core may comprise a thermoset composition or a thermoplastic composition while the outer core layer may be formed from either of a thermoset composition or a thermoplastic composition. And the outer cover layer of inventive tri-part thermoplastic blend may consist of numerous possible variations and combinations of ionomer, thermoplastic polymer selected from thermoplastic polyurethanes, thermoplastic polyureas, and polyurea-polyurethane hybrids with many different MMA-containing core-shell constructions. Once again, outer cover hardnesses may range from 20 shore D to 70 Shore D, although it is envisioned that the hardness of a layer of inventive tri-part thermoplastic blend can be targeted within any known range by modifying the ingredients of the ionomer, thermoplastic polymer and selecting particular core-shell polymers by varying the relative amounts of ionomer, thermoplastic polymer and plurality of core-shell polymers in the tri-part thermoplastic blend, as well as by modifying the processing time and temperature.

In another embodiment, in a four piece golf ball, a rubber-based dual core may be surrounded by an inner cover layer formed from inventive tri-part thermoplastic blend consisting of ionomer, thermoplastic polyurea and a plurality of core-shell polymers while an outer cover layer disposed thereabout containing a conventional polyurea composition.

In one embodiment, at least one of the core layers is formed of a rubber composition comprising polybutadiene rubber material. More particularly, in one version, the ball contains a single inner core formed of the polybutadiene rubber composition. In a second version, the ball contains a dual-core comprising an inner core (center) and surrounding outer core layer.

In one version, the core is formed of a rubber composition comprising a rubber material such as, for example, polybutadiene, ethylene-propylene rubber, ethylene-propylene-diene rubber, polyisoprene, styrene-butadiene rubber, polyalkenamers, butyl rubber, halobutyl rubber, or polystyrene elastomers. For example, polybutadiene rubber compositions may be used to form the inner core (center) and surrounding outer core layer in a dual-layer construction. In another version, the core may be formed from an ionomer composition comprising an ethylene acid copolymer containing acid groups such that greater than 70% of the acid groups are neutralized. These highly neutralized polymers (HNPs) also may be used to form at least one core layer in a multi-layered core construction. For example, a polybutadiene rubber composition may be used to form the center and a HNP composition may be used to form the outer core. Such rubber and HNP compositions may be as discussed herein.

In general, polybutadiene is a homopolymer of 1, 3-butadiene. The double bonds in the 1, 3-butadiene monomer are attacked by catalysts to grow the polymer chain and form a polybutadiene polymer having a desired molecular weight. Any suitable catalyst may be used to synthesize the polybutadiene rubber depending upon the desired properties. Normally, a transition metal complex (for example, neodymium, nickel, or cobalt) or an alkyl metal such as alkyllithium is used as a catalyst. Other catalysts include, but are not limited to, aluminum, boron, lithium, titanium, and combinations thereof. The catalysts produce polybutadiene rubbers having different chemical structures. In a cis-bond configuration, the main internal polymer chain of the polybutadiene appears on the same side of the carbon-carbon double bond contained in the polybutadiene. In a trans-bond configuration, the main internal polymer chain is on opposite sides of the internal carbon-carbon double bond in the polybutadiene. The polybutadiene rubber can have various combinations of cis- and trans-bond structures. A preferred polybutadiene rubber has a 1,4 cis-bond content of at least 40%, preferably greater than 80%, and more preferably greater than 90%. In general, polybutadiene rubbers having a high 1,4 cis-bond content have high tensile strength. The polybutadiene rubber may have a relatively high or low Mooney viscosity.

Examples of commercially-available polybutadiene rubbers that can be used in accordance with this invention, include, but are not limited to, BR 01 and BR 1220, available from BST Elastomers of Bangkok, Thailand; SE BR 1220LA and SE BR1203, available from DOW Chemical Co of Midland, Mich.; BUDENE 1207, 1207s, 1208, and 1280 available from Goodyear, Inc of Akron, Ohio; BR 01, 51 and 730, available from Japan Synthetic Rubber (JSR) of Tokyo, Japan; BUNA CB 21, CB 22, CB 23, CB 24, CB 25, CB 29 MES, CB 60, CB Nd 60, CB 55 NF, CB 70 B, CB KA 8967, and CB 1221, available from Lanxess Corp. of Pittsburgh. Pa.; BR1208, available from LG Chemical of Seoul, South Korea; UBEPOL BR130B, BR150, BR150B, BR150L, BR230, BR360L, BR710, and VCR617, available from UBE Industries, Ltd. of Tokyo, Japan; EUROPRENE NEOCIS BR 60, INTENE 60 AF and P30AF, and EUROPRENE BR HV80, available from Polimeri Europa of Rome, Italy; AFDENE 50 and NEODENE BR40, BR45, BR50 and BR60, available from Karbochem (PTY) Ltd. of Bruma, South Africa; KBR 01, NdBr 40, NdBR-45, NdBr 60, KBR 710S, KBR 710H, and KBR 750, available from Kumho Petrochemical Co., Ltd. Of Seoul, South Korea; and DIENE 55NF, 70AC, and 320 AC, available from Firestone Polymers of Akron, Ohio.

To form the core, the polybutadiene rubber is used in an amount of at least about 5% by weight based on total weight of composition and is generally present in an amount of about 5% to about 100%, or an amount within a range having a lower limit of 5% or 10% or 20% or 30% or 40% or 50% and an upper limit of 55% or 60% or 70% or 80% or 90% or 95% or 100%. In general, the concentration of polybutadiene rubber is about 45 to about 95 weight percent. Preferably, the rubber material used to form the core layer comprises at least 50% by weight, and more preferably at least 70% by weight, polybutadiene rubber.

The rubber compositions of this invention may be cured, either by pre-blending or post-blending, using conventional curing processes. Suitable curing processes include, for example, peroxide-curing, sulfur-curing, high-energy radiation, and combinations thereof. Preferably, the rubber composition contains a free-radical initiator selected from organic peroxides, high energy radiation sources capable of generating free-radicals, and combinations thereof. In one preferred version, the rubber composition is peroxide-cured. Suitable organic peroxides include, but are not limited to, dicumyl peroxide; n-butyl-4,4-di(t-butylperoxy) valerate; 1,1-di(t-butylperoxy)3,3,5-trimethylcyclohexane; 2,5-dimethyl-2,5-di(t-butylperoxy) hexane; di-t-butyl peroxide; di-t-amyl peroxide; t-butyl peroxide; t-butyl cumyl peroxide; 2,5-dimethyl-2,5-di(t-butylperoxy)hexyne-3; di(2-t-butylperoxyisopropyl)benzene; dilauroyl peroxide; dibenzoyl peroxide; t-butyl hydroperoxide; and combinations thereof. In a particular embodiment, the free radical initiator is dicumyl peroxide, including, but not limited to Perkadox® BC, commercially available from Akzo Nobel. Peroxide free-radical initiators are generally present in the rubber composition in an amount of at least 0.05 parts by weight per 100 parts of the total rubber, or an amount within the range having a lower limit of 0.05 parts or 0.1 parts or 1 part or 1.25 parts or 1.5 parts or 2.5 parts or 5 parts by weight per 100 parts of the total rubbers, and an upper limit of 2.5 parts or 3 parts or 5 parts or 6 parts or 10 parts or 15 parts by weight per 100 parts of the total rubber. Concentrations are in parts per hundred (phr) unless otherwise indicated. As used herein, the term, "parts per hundred," also known as "phr" or "pph" is defined as the number of parts by weight of a particular component present in a mixture, relative to 100 parts by weight of the polymer component. Mathematically, this can be expressed as the weight of an ingredient divided by the total weight of the polymer, multiplied by a factor of 100.

The rubber compositions preferably include a reactive cross-linking co-agent. Suitable co-agents include, but are not limited to, metal salts of unsaturated carboxylic acids having from 3 to 8 carbon atoms; unsaturated vinyl compounds and polyfunctional monomers (e.g., trimethylolpropane trimethacrylate); phenylene bismaleimide; and combinations thereof. Particular examples of suitable metal salts include, but are not limited to, one or more metal salts of acrylates, diacrylates, methacrylates, and dimethacrylates, wherein the metal is selected from magnesium, calcium, zinc, aluminum, lithium, and nickel. In a particular embodiment, the co-agent is selected from zinc salts of acrylates, diacrylates, methacrylates, and dimethacrylates. In another particular embodiment, the agent is zinc diacrylate (ZDA). When the co-agent is zinc diacrylate and/or zinc dimethacrylate, the co-agent is typically included in the rubber composition in an amount within the range having a lower limit of 1 or 5 or 10 or 15 or 19 or 20 parts by weight per 100 parts of the total rubber, and an upper limit of 24 or 25 or 30 or 35 or 40 or 45 or 50 or 60 parts by weight per 100 parts of the base rubber.

Radical scavengers such as a halogenated organosulfur or metal salt thereof, organic disulfide, or inorganic disulfide compounds may be added to the rubber composition. These compounds also may function as "soft and fast agents." As used herein, "soft and fast agent" means any compound or a blend thereof that is capable of making a core: 1) softer (having a lower compression) at a constant "coefficient of restitution" (COR); and/or 2) faster (having a higher COR at equal compression), when compared to a core equivalently prepared without a soft and fast agent. Preferred halogenated organosulfur compounds include, but are not limited to, pentachlorothiophenol (PCTP) and salts of PCTP such as zinc pentachlorothiophenol (ZnPCTP). Using PCTP and ZnPCTP in golf ball inner cores helps produce softer and faster inner cores. The PCTP and ZnPCTP compounds help increase the resiliency and the coefficient of restitution of the core. In a particular embodiment, the soft and fast agent is selected from ZnPCTP, PCTP, ditolyl disulfide, diphenyl disulfide, dixylyl disulfide, 2-nitroresorcinol, and combinations thereof.

The rubber compositions of the present invention also may include "fillers," which are added to adjust the density and/or specific gravity of the material. Suitable fillers include, but are not limited to, polymeric or mineral fillers, metal fillers, metal alloy fillers, metal oxide fillers and carbonaceous fillers. The fillers can be in any suitable form including, but not limited to, flakes, fibers, whiskers, fibrils, plates, particles, and powders. Rubber regrind, which is ground, recycled rubber material (for example, ground to about 30 mesh particle size) obtained from discarded rubber golf ball cores, also can be used as a filler. The amount and type of fillers utilized are governed by the amount and weight of other ingredients in the golf ball, since a maximum golf ball weight of 45.93 g (1.62 ounces) has been established by the United States Golf Association (USGA).

Suitable polymeric or mineral fillers that may be added to the rubber composition include, for example, precipitated hydrated silica, clay, talc, asbestos, glass fibers, aramid fibers, mica, calcium metasilicate, barium sulfate, zinc sulfide, lithopone, silicates, silicon carbide, tungsten carbide, diatomaceous earth, polyvinyl chloride, carbonates such as calcium carbonate and magnesium carbonate. Suitable metal fillers include titanium, tungsten, aluminum, bismuth, nickel, molybdenum, iron, lead, copper, boron, cobalt, beryllium, zinc, and tin. Suitable metal alloys include steel, brass, bronze, boron carbide whiskers, and tungsten carbide whiskers. Suitable metal oxide fillers include zinc oxide, iron oxide, aluminum oxide, titanium oxide, magnesium oxide, and zirconium oxide. Suitable particulate carbonaceous fillers include graphite, carbon black, cotton flock, natural bitumen, cellulose flock, and leather fiber. Micro balloon fillers such as glass and ceramic, and fly ash fillers can also be used. In a particular aspect of this embodiment, the rubber composition includes filler(s) selected from carbon black, nanoclays (e.g., Cloisite® and Nanofil® nanoclays, commercially available from Southern Clay Products, Inc., and Nanomax® and Nanomer® nanoclays, commercially available from Nanocor, Inc.), talc (e.g., Luzenac HAR® high aspect ratio talcs, commercially available from Luzenac America, Inc.), glass (e.g., glass flake, milled glass, and microglass), mica and mica-based pigments (e.g., Iriodin® pearl luster pigments, commercially available from The Merck Group), and combinations thereof. In a particular embodiment, the rubber composition is modified with organic fiber micropulp.

In addition, the rubber compositions may include antioxidants to prevent the breakdown of the elastomers. Also, processing aids such as high molecular weight organic acids and salts thereof, may be added to the composition. In a particular embodiment, the total amount of additive(s) and filler(s) present in the rubber composition is 15 wt % or less, or 12 wt % or less, or 10 wt % or less, or 9 wt % or less, or 6 wt % or less, or 5 wt % or less, or 4 wt % or less, or 3 wt % or less, based on the total weight of the rubber composition.

The polybutadiene rubber material (base rubber) may be blended with other elastomers in accordance with this invention. Other elastomers include, but are not limited to, polybutadiene, polyisoprene, ethylene propylene rubber ("EPR"), styrene-butadiene rubber, styrenic block copolymer rubbers (such as "SI", "SIS", "SB", "SBS", "SIBS", and the like, where "S" is styrene, "I" is isobutylene, and "B" is butadiene), polyalkenamers such as, for example, polyoctenamer, butyl rubber, halobutyl rubber, polystyrene elastomers, polyethylene elastomers, polyurethane elastomers, polyurea elastomers, metallocene-catalyzed elastomers and plastomers, copolymers of isobutylene and p-alkylstyrene, halogenated copolymers of isobutylene and p-alkylstyrene, copolymers of butadiene with acrylonitrile, polychloroprene, alkyl acrylate rubber, chlorinated isoprene rubber, acrylonitrile chlorinated isoprene rubber, and combinations of two or more thereof.

The polymers, free-radical initiators, filler, cross-linking agents, and any other materials used in forming either the golf ball center or any of the core, in accordance with invention, may be combined to form a mixture by any type of mixing known to one of ordinary skill in the art. Suitable types of mixing include single pass and multi-pass mixing, and the like. The cross-linking agent, and any other optional additives used to modify the characteristics of the golf ball center or additional layer(s), may similarly be combined by any type of mixing. A single-pass mixing process where ingredients are added sequentially is preferred, as this type of mixing tends to increase efficiency and reduce costs for the process. The preferred mixing cycle is single step wherein the polymer, cis-to-trans catalyst, filler, zinc diacrylate, and peroxide are added in sequence.

In one preferred embodiment, the entire core or at least one core layer in a multi-layered structure is formed of a rubber composition comprising a material selected from the group of natural and synthetic rubbers including, but not limited to, polybutadiene, polyisoprene, ethylene propylene rubber ("EPR"), ethylene-propylene-diene ("EPDM") rubber, styrene-butadiene rubber, styrenic block copolymer rubbers (such as "SI", "SIS", "SB", "SBS", "SIBS", and the like, where "S" is styrene, "I" is isobutylene, and "B" is butadiene), polyalkenamers such as, for example, polyoctenamer, butyl rubber, halobutyl rubber, polystyrene elastomers, polyethylene elastomers, polyurethane elastomers, polyurea elastomers, metallocene-catalyzed elastomers and plastomers, copolymers of isobutylene and p-alkylstyrene, halogenated copolymers of isobutylene and p-alkylstyrene, copolymers of butadiene with acrylonitrile, polychloroprene, alkyl acrylate rubber, chlorinated isoprene rubber, acrylonitrile chlorinated isoprene rubber, and combinations of two or more thereof.

As discussed above, single and multi-layered cores can be made in accordance with this invention. In two-layered cores, a thermoset material such as, for example, thermoset rubber, can be used to make the outer core layer or a thermoplastic material such as, for example, ethylene acid copolymer containing acid groups that are at least partially or fully neutralized can be used to make the outer core layer. Suitable ionomer compositions include partially-neutralized ionomers and highly-neutralized ionomers (HNPs), including ionomers formed from blends of two or more partially-neutralized ionomers, blends of two or more highly-neutralized ionomers, and blends of one or more partially-neutralized ionomers with one or more highly-neutralized ionomers. Suitable ethylene acid copolymer ionomers and other thermoplastics that can be used to form the core layer(s) are the same materials that can be used to make an inner cover layer as discussed further below.

In another example, multi-layered cores having an inner core, intermediate core layer, and outer core layer, wherein the intermediate core layer is disposed between the intermediate and outer core layers may be prepared in accordance with this invention. More particularly, as discussed above, the inner core may be constructed from a thermoplastic or thermoset composition, such as thermoset rubber. Meanwhile, the intermediate and outer core layers also may be formed from thermoset or thermoplastic materials. Suitable thermoset and thermoplastic compositions that may be used to form the intermediate/outer core layers are discussed above. For example, each of the intermediate and outer core layers may be formed from a thermoset rubber composition. Thus, the intermediate core layer may be formed from a first thermoset rubber composition; and the outer core layer may be formed from a second thermoset rubber composition. In another embodiment, the intermediate core layer is formed from a thermoset composition; and the outer core layer is formed from a thermoplastic composition. In a third embodiment, the intermediate core layer is formed from a thermoplastic composition; and the outer core layer is formed from a thermoset composition. Finally, in a fourth embodiment, the intermediate core layer is formed from a first thermoplastic composition; and the outer core layer is formed from a second thermoplastic compositions.

Other suitable thermoplastic polymers that may be used to form the intermediate layer include, but are not limited to, the following polymers (including homopolymers, copolymers, and derivatives thereof: (a) polyester, particularly those modified with a compatibilizing group such as sulfonate or phosphonate, including modified poly(ethylene terephthalate), modified poly(butylene terephthalate), modified poly(propylene terephthalate), modified poly(trimethylene terephthalate), modified poly(ethylene naphthenate), and those disclosed in U.S. Pat. Nos. 6,353,050, 6,274,298, and 6,001,930, the entire disclosures of which are hereby incorporated herein by reference, and blends of two or more thereof; (b) polyamides, polyamide-ethers, and polyamide-esters, and those disclosed in U.S. Pat. Nos. 6,187,864, 6,001,930, and 5,981,654, the entire disclosures of which are hereby incorporated herein by reference, and blends of two or more thereof; (c) polyurethanes, polyureas, polyurethane-polyurea hybrids, and blends of two or more thereof; (d) fluoropolymers, such as those disclosed in U.S. Pat. Nos. 5,691,066, 6,747,110 and 7,009,002, the entire disclosures of which are hereby incorporated herein by reference, and blends of two or more thereof; (e) polystyrenes, such as poly(styrene-co-maleic anhydride), acrylonitrile-butadiene-styrene, poly(styrene sulfonate), polyethylene styrene, and blends of two or more thereof; (f) polyvinyl chlorides and grafted polyvinyl chlorides, and blends of two or more thereof; (g) polycarbonates, blends of polycarbonate/acrylonitrile-butadiene-styrene, blends of polycarbonate/polyurethane, blends of polycarbonate/polyester, and blends of two or more thereof; (h) polyethers, such as polyarylene ethers, polyphenylene oxides, block copolymers of alkenyl aromatics with vinyl aromatics and polyamicesters, and blends of two or more thereof; (i) polyimides, polyetherketones, polyamideimides, and blends of two or more thereof; and (j) polycarbonate/polyester copolymers and blends.

It also is recognized that thermoplastic materials can be "converted" into thermoset materials by cross-linking the polymer chains so they form a network structure, and such cross-linked thermoplastic materials may be used to form the core and intermediate layers in accordance with this invention. For example, thermoplastic polyolefins such as linear low density polyethylene (LLDPE), low density polyethylene (LDPE), and high density polyethylene (HDPE) may be cross-linked to form bonds between the polymer chains. The cross-linked thermoplastic material typically has improved physical properties and strength over non-cross-linked thermoplastics, particularly at temperatures above the crystalline melting point. Preferably a partially or fully-neutralized ionomer, as described above, is covalently cross-linked to render it into a thermoset composition (that is, it contains at least some level of covalent, irreversable cross-links). Thermoplastic polyurethanes and polyureas also may be converted into thermoset materials in accordance with the present invention.

The cross-linked thermoplastic material may be created by exposing the thermoplastic to: 1) a high-energy radiation treatment, such as electron beam or gamma radiation, such as disclosed in U.S. Pat. No. 5,891,973, which is incorporated by reference herein, 2) lower energy radiation, such as ultra-violet (UV) or infra-red (IR) radiation; 3) a solution treatment, such as an isocyanate or a silane; 4) incorporation of additional free radical initiator groups in the thermoplastic prior to molding; and/or 5) chemical modification, such as esterification or saponification, to name a few.

Modifications in thermoplastic polymeric structure can be induced by a number of methods, including exposing the thermoplastic material to high-energy radiation or through a chemical process using peroxide. Radiation sources include, but are not limited to, gamma-rays, electrons, neutrons, protons, x-rays, helium nuclei, or the like. Gamma radiation, typically using radioactive cobalt atoms and allows for considerable depth of treatment, if necessary. For core layers requiring lower depth of penetration, electron-beam accelerators or UV and IR light sources can be used. Useful UV and IR irradiation methods are disclosed in U.S. Pat. Nos. 6,855,070 and 7,198,576, which are incorporated herein by reference. The thermoplastic layers may be irradiated at dosages greater than 0.05 Mrd, or ranging from 1 Mrd to 20 Mrd, or ranging from 2 Mrd to 15 Mrd, or ranging from 4 Mrd to 10 Mrd. In one embodiment, the layer may be irradiated at a dosage from 5 Mrd to 8 Mrd and in another embodiment, the layer may be irradiated with a dosage from 0.05 Mrd to 3 Mrd, or from 0.05 Mrd to 1.5 Mrd.

The solid cores for the golf balls of this invention may be made using any suitable conventional technique such as, for example, compression or injection-molding, Typically, the cores are formed by compression molding a slug of uncured or lightly cured rubber material into a spherical structure. Prior to forming the cover layer, the core structure may be surface-treated to increase the adhesion between its outer surface and adjacent layer. Such surface-treatment may include mechanically or chemically-abrading the outer surface of the core. For example, the core may be subjected to corona-discharge, plasma-treatment, silane-dipping, or other treatment methods known to those in the art. The cover layers are formed over the core or ball sub-assembly (the core structure and any intermediate layers disposed about the core) using any suitable method as described further below. Prior to forming the cover layers, the ball sub-assembly may be surface-treated to increase the adhesion between its outer surface and the overlying cover material using the above-described techniques.

Conventional compression and injection-molding and other methods can be used to form cover layers over the core or ball sub-assembly. In general, compression molding normally involves first making half (hemispherical) shells by injection-molding the composition in an injection mold. This produces semi-cured, semi-rigid half-shells (or cups). Then, the half-shells are positioned in a compression mold around the core or ball sub-assembly. Heat and pressure are applied and the half-shells fuse together to form a cover layer over the core or sub-assembly. Compression molding also can be used to cure the cover composition after injection-molding. For example, a thermally-curable composition can be injection-molded around a core in an unheated mold. After the composition is partially hardened, the ball is removed and placed in a compression mold. Heat and pressure are applied to the ball and this causes thermal-curing of the outer cover layer.

Retractable pin injection-molding (RPIM) methods generally involve using upper and lower mold cavities that are mated together. The upper and lower mold cavities form a spherical interior cavity when they are joined together. The mold cavities used to form the outer cover layer have interior dimple cavity details. The cover material conforms to the interior geometry of the mold cavities to form a dimple pattern on the surface of the ball. The injection-mold includes retractable support pins positioned throughout the mold cavities. The retractable support pins move in and out of the cavity. The support pins help maintain the position of the core or ball sub-assembly while the molten composition flows through the mold gates. The molten composition flows into the cavity between the core and mold cavities to surround the core and form the cover layer. Other methods can be used to make the cover including, for example, reaction injection-molding (RIM), liquid injection-molding, casting, spraying, powder-coating, vacuum-forming, flow-coating, dipping, spin-coating, and the like.

As discussed above, an inner cover layer or intermediate layer, preferably formed from an ethylene acid copolymer ionomer composition, can be formed between the core or ball sub-assembly and cover layer. The intermediate layer comprising the ionomer composition may be formed using a conventional technique such as, for example, compression or injection-molding. For example, the ionomer composition may be injection-molded or placed in a compression mold to produce half-shells. These shells are placed around the core in a compression mold, and the shells fuse together to form an intermediate layer. Alternatively, the ionomer composition is injection-molded directly onto the core using retractable pin injection-molding.

After the golf balls have been removed from the mold, they may be subjected to finishing steps such as flash-trimming, surface-treatment, marking, and one or more coating layer may be applied as desired via methods such as spraying, dipping, brushing, or rolling. Then the golf ball can go through a series of finishing steps.

For example, in traditional white-colored golf balls, the white-pigmented outer cover layer may be surface-treated using a suitable method such as, for example, corona, plasma, or ultraviolet (UV) light-treatment. In another finishing process, the golf balls are painted with one or more paint coatings. For example, white or clear primer paint may be applied first to the surface of the ball and then indicia may be applied over the primer followed by application of a clear polyurethane top-coat. Indicia such as trademarks, symbols, logos, letters, and the like may be printed on the outer cover or prime-coated layer, or top-coated layer using pad-printing, ink-jet printing, dye-sublimation, or other suitable printing methods. Any of the surface coatings may contain a fluorescent optical brightener.

The golf balls of this invention provide the ball with a variety of advantageous mechanical and playing performance properties as discussed further below. In general, the hardness, diameter, and thickness of the different ball layers may vary depending upon the desired ball construction. Thus, golf balls of the invention may have any known overall diameter and any known number of different layers and layer thicknesses, wherein the inventive tri-part thermoplastic blend is incorporated in one or more of those layers in order to target desired playing characteristics.

For example, the core may have a diameter ranging from about 0.09 inches to about 1.65 inches. In one embodiment, the diameter of the core of the present invention is about 1.2 inches to about 1.630 inches. When part of a two-piece ball according to invention, the core may have a diameter ranging from about 1.5 inches to about 1.62 inches. In another embodiment, the diameter of the core is about 1.3 inches to about 1.6 inches, preferably from about 1.39 inches to about 1.6 inches, and more preferably from about 1.5 inches to about 1.6 inches. In yet another embodiment, the core has a diameter of about 1.55 inches to about 1.65 inches, preferably about 1.55 inches to about 1.60 inches.

In some embodiments, the core may have an overall diameter within a range having a lower limit of 0.500 or 0.700 or 0.750 or 0.800 or 0.850 or 0.900 or 0.950 or 1.000 or 1.100 or 1.150 or 1.200 or 1.250 or 1.300 or 1.350 or 1.400 or 1.450 or 1.500 or 1.600 or 1.610 inches and an upper limit of 1.620 or 1.630 or 1.640 inches. In a particular embodiment, the core is a multi-layer core having an overall diameter within a range having a lower limit of 0.500 or 0.700 or 0.750 or 0.800 or 0.850 or 0.900 or 0.950 or 1.000 or 1.100 or 1.150 or 1.200 inches and an upper limit of 1.250 or 1.300 or 1.350 or 1.400 or 1.450 or 1.500 or 1.600 or 1.610 or 1.620 or 1.630 or 1.640 inches. In another particular embodiment, the multi-layer core has an overall diameter within a range having a lower limit of 0.500 or 0.700 or 0.750 inches and an upper limit of 0.800 or 0.850 or 0.900 or 0.950 or 1.000 or 1.100 or 1.150 or 1.200 or 1.250 or 1.300 or 1.350 or 1.400 or 1.450 or 1.500 or 1.600 or 1.610 or 1.620 or 1.630 or 1.640 inches. In another particular embodiment, the multi-layer core has an overall diameter of 1.500 inches or 1.510 inches or 1.530 inches or 1.550 inches or 1.570 inches or 1.580 inches or 1.590 inches or 1.600 inches or 1.610 inches or 1.620 inches.

In some embodiments, the inner core can have an overall diameter of 0.500 inches or greater, or 0.700 inches or greater, or 1.00 inches or greater, or 1.250 inches or greater, or 1.350 inches or greater, or 1.390 inches or greater, or 1.450 inches or greater, or an overall diameter within a range having a lower limit of 0.250 or 0.500 or 0.750 or 1.000 or 1.250 or 1.350 or 1.390 or 1.400 or 1.440 inches and an upper limit of 1.460 or 1.490 or 1.500 or 1.550 or 1.580 or 1.600 inches, or an overall diameter within a range having a lower limit of 0.250 or 0.300 or 0.350 or 0.400 or 0.500 or 0.550 or 0.600 or 0.650 or 0.700 inches and an upper limit of 0.750 or 0.800 or 0.900 or 0.950 or 1.000 or 1.100 or 1.150 or 1.200 or 1.250 or 1.300 or 1.350 or 1.400 inches.

In some embodiments, the outer core layer can have an overall thickness within a range having a lower limit of 0.010 or 0.020 or 0.025 or 0.030 or 0.035 inches and an upper limit of 0.040 or 0.070 or 0.075 or 0.080 or 0.100 or 0.150 inches, or an overall thickness within a range having a lower limit of 0.025 or 0.050 or 0.100 or 0.150 or 0.160 or 0.170 or 0.200 inches and an upper limit of 0.225 or 0.250 or 0.275 or 0.300 or 0.325 or 0.350 or 0.400 or 0.450 or greater than 0.450 inches. The outer core layer may alternatively have a thickness of greater than 0.10 inches, or 0.20 inches or greater, or greater than 0.20 inches, or 0.30 inches or greater, or greater than 0.30 inches, or 0.35 inches or greater, or greater than 0.35 inches, or 0.40 inches or greater, or greater than 0.40 inches, or 0.45 inches or greater, or greater than 0.45 inches, or a thickness within a range having a lower limit of 0.005 or 0.010 or 0.015 or 0.020 or 0.025 or 0.030 or 0.035 or 0.040 or 0.045 or 0.050 or 0.055 or 0.060 or 0.065 or 0.070 or 0.075 or 0.080 or 0.090 or 0.100 or 0.200 or 0.250 inches and an upper limit of 0.300 or 0.350 or 0.400 or 0.450 or 0.500 or 0.750 inches.

An intermediate core layer can have any known overall thickness such as within a range having a lower limit of 0.005 or 0.010 or 0.015 or 0.020 or 0.025 or 0.030 or 0.035 or 0.040 or 0.045 inches and an upper limit of 0.050 or 0.055 or 0.060 or 0.065 or 0.070 or 0.075 or 0.080 or 0.090 or 0.100 inches.

The cores and core layers of golf balls of the invention may have varying hardnesses depending on the particular golf ball construction and playing characteristics being targeted. Core center and/or layer hardness can range, for example, from 35 Shore C to about 98 Shore C, or 50 Shore C to about 90 Shore C, or 60 Shore C to about 85 Shore C, or 45 Shore C to about 75 Shore C, or 40 Shore C to about 85 Shore C. In other embodiments, core center and/or layer hardness can range, for example, from about 20 Shore D to about 78 Shore D, or from about 30 Shore D to about 60 Shore D, or from about 40 Shore D to about 50 Shore D, or 50 Shore D or less, or greater than 50 Shore D.

The compression of the core is generally overall in the range of about 40 to about 110, although embodiments are envisioned wherein the compression of the core is as low as 5. In other embodiments, the overall CoR of cores of the present invention at 125 ft/s is at least 0.750, or at least 0.775 or at least 0.780, or at least 0.785, or at least 0.790, or at least 0.795, or at least 0.800. Cores are also known to comprise rubbers and also may be formed of a variety of other materials that are typically also used for intermediate and cover layers. Intermediate layers may likewise also comprise materials generally used in cores and covers as described herein for example.

An intermediate layer is sometimes thought of as including any layer(s) disposed between the inner core (or center) and the outer cover of a golf ball, and thus in some embodiments, the intermediate layer may include an outer core layer, a casing layer, or inner cover layer(s). In this regard, a golf ball of the invention may include one or more intermediate layers. An intermediate layer may be used, if desired, with a multilayer cover or a multilayer core, or with both a multilayer cover and a multilayer core.

In one non-limiting embodiment, an intermediate layer having a thickness of about 0.010 inches to about 0.06 inches, is disposed about a core having a diameter ranging from about 1.5 inches to about 1.59 inches.

Intermediate layer(s) may be formed, at least in part, from one or more homopolymeric or copolymeric materials, such as ionomers, primarily or fully non-ionomeric thermoplastic materials, vinyl resins, polyolefins, polyurethanes, polyureas, polyamides, acrylic resins and blends thereof, olefinic thermoplastic rubbers, block copolymers of styrene and butadiene, isoprene or ethylene-butylene rubber, copoly (ether-amide), polyphenylene oxide resins or blends thereof, and thermoplastic polyesters. However, embodiments are envisioned wherein at least one intermediate layer is formed from a different material commonly used in a core and/or cover layer.

The range of thicknesses for an intermediate layer of a golf ball is large because of the vast possibilities when using an intermediate layer, i.e., as an outer core layer, an inner cover layer, a wound layer, a moisture/vapor barrier layer. When used in a golf ball of the present invention, the intermediate layer, or inner cover layer, may have a thickness about 0.3 inches or less. In one embodiment, the thickness of the intermediate layer is from about 0.002 inches to about 0.1 inches, and preferably about 0.01 inches or greater. For example, when part of a three-piece ball or multi-layer ball according to the invention, the intermediate layer and/or inner cover layer may have a thickness ranging from about 0.010 inches to about 0.06 inches. In another embodiment, the intermediate layer thickness is about 0.05 inches or less, or about 0.01 inches to about 0.045 inches for example.

If the ball includes an intermediate layer or inner cover layer, the hardness (material) may for example be about 50 Shore D or greater, more preferably about 55 Shore D or greater, and most preferably about 60 Shore D or greater. In one embodiment, the inner cover has a Shore D hardness of about 62 to about 90 Shore D. In one example, the inner cover has a hardness of about 68 Shore D or greater. In addition, the thickness of the inner cover layer is preferably about 0.015 inches to about 0.100 inches, more preferably about 0.020 inches to about 0.080 inches, and most preferably about 0.030 inches to about 0.050 inches, but once again, may be changed to target playing characteristics.

The cover typically has a thickness to provide sufficient strength, good performance characteristics, and durability. In one embodiment, the cover thickness may for example be from about 0.02 inches to about 0.12 inches, or about 0.1 inches or less. For example, the cover may be part of a two-piece golf ball and have a thickness ranging from about 0.03 inches to about 0.09 inches. In another embodiment, the cover thickness may be about 0.05 inches or less, or from about 0.02 inches to about 0.05 inches, or from about 0.02 inches and about 0.045 inches.

The cover may be a single-, dual-, or multi-layer cover and have an overall thickness for example within a range having a lower limit of 0.010 or 0.020 or 0.025 or 0.030 or 0.040 or 0.045 inches and an upper limit of 0.050 or 0.060 or 0.070 or 0.075 or 0.080 or 0.090 or 0.100 or 0.150 or 0.200 or 0.300 or 0.500 inches. In a particular embodiment, the cover may be a single layer having a thickness of from 0.010 or 0.020 or 0.025 inches to 0.035 or 0.040 or 0.050 inches. In another particular embodiment, the cover may consist of an inner cover layer having a thickness of from 0.010 or 0.020 or 0.025 inches to 0.035 or 0.050 inches and an outer cover layer having a thickness of from 0.010 or 0.020 or 0.025 inches to 0.035 or 0.040 inches.

The outer cover preferably has a thickness within a range having a lower limit of about 0.004 or 0.010 or 0.020 or 0.030 or 0.040 inches and an upper limit of about 0.050 or 0.055 or 0.065 or 0.070 or 0.080 inches. Preferably, the thickness of the outer cover is about 0.020 inches or less. The outer cover preferably has a surface hardness of 75 Shore D or less, 65 Shore D or less, 55 Shore D or less, or 50 Shore D or less, or 50 Shore D or less, or 45 Shore D or less. Preferably, the outer cover has hardness in the range of about 20 to about 70 Shore D. In one example, the outer cover has hardness in the range of about 25 to about 65 Shore D.

In one embodiment, the cover may be a single layer having a surface hardness for example of 60 Shore D or greater, or 65 Shore D or greater. In a particular aspect of this embodiment, the cover is formed from a composition having a material hardness of 60 Shore D or greater, or 65 Shore D or greater.

In another particular embodiment, the cover may be a single layer having a thickness of from 0.010 or 0.020 inches to 0.035 or 0.050 inches and formed from a composition having a material hardness of from 60 or 62 or 65 Shore D to 65 or 70 or 72 Shore D.

In yet another particular embodiment, the cover is a single layer having a thickness of from 0.010 or 0.025 inches to 0.035 or 0.040 inches and formed from a composition having a material hardness of 62 Shore D or less, or less than 62 Shore D, or 60 Shore D or less, or less than 60 Shore D, or 55 Shore D or less, or less than 55 Shore D.

In still another particular embodiment, the cover is a single layer having a thickness of from 0.010 or 0.025 inches to 0.035 or 0.040 inches and formed from a composition having a material hardness of 62 Shore D or less, or less than 62 Shore D, or 60 Shore D or less, or less than 60 Shore D, or 55 Shore D or less, or less than 55 Shore D.

In an alternative embodiment, the cover may comprise an inner cover layer and an outer cover layer. The inner cover layer composition may have a material hardness of from 60 or 62 or 65 Shore D to 65 or 70 or 72 Shore D. The inner cover layer may have a thickness within a range having a lower limit of 0.010 or 0.020 or 0.030 inches and an upper limit of 0.035 or 0.040 or 0.050 inches. The outer cover layer composition may have a material hardness of 62 Shore D or less, or less than 62 Shore D, or 60 Shore D or less, or less than 60 Shore D, or 55 Shore D or less, or less than 55 Shore D. The outer cover layer may have a thickness within a range having a lower limit of 0.010 or 0.020 or 0.025 inches and an upper limit of 0.035 or 0.040 or 0.050 inches.

In yet another embodiment, the cover is a dual- or multi-layer cover including an inner or intermediate cover layer and an outer cover layer. The inner cover layer may have a surface hardness of 70 Shore D or less, or 65 Shore D or less, or less than 65 Shore D, or a Shore D hardness of from 50 to 65, or a Shore D hardness of from 57 to 60, or a Shore D hardness of 58, and a thickness within a range having a lower limit of 0.010 or 0.020 or 0.030 inches and an upper limit of 0.045 or 0.080 or 0.120 inches. The outer cover layer may have a material hardness of 65 Shore D or less, or 55 Shore D or less, or 45 Shore D or less, or 40 Shore D or less, or from 25 Shore D to 40 Shore D, or from 30 Shore D to 40 Shore D. The outer cover layer may have a surface hardness within a range having a lower limit of 20 or 30 or 35 or 40 Shore D and an upper limit of 52 or 58 or 60 or 65 or 70 or 72 or 75 Shore D. The outer cover layer may have a thickness within a range having a lower limit of 0.010 or 0.015 or 0.025 inches and an upper limit of 0.035 or 0.040 or 0.045 or 0.050 or 0.055 or 0.075 or 0.080 or 0.115 inches.

All this being said, embodiments are also envisioned wherein one or more of the cover layers is formed from a material typically incorporated in a core or intermediate layer.

It is envisioned that golf balls of the invention may also incorporate conventional coating layer(s) for the purposes usually incorporated. For example, one or more coating layer may have a combined thickness of from about 0.1 µm to about 100 µm, or from about 2 µm to about 50 µm, or from about 2 µm to about 30 µm. Meanwhile, each coating layer may have a thickness of from about 0.1 µm to about 50 µm, or from about 0.1 µm to about 25 µm, or from about 0.1 µm to about 14 µm, or from about 2 µm to about 9 µm, for example.

It is envisioned that layers a golf ball of the invention may be incorporated via any of casting, compression molding, injection molding, or thermoforming.

The resulting balls of this invention have good impact durability and cut/shear-resistance. The United States Golf Association ("USGA") has set total weight limits for golf balls. Particularly, the USGA has established a maximum weight of 45.93 g (1.62 ounces) for golf balls. There is no lower weight limit. In addition, the USGA requires that golf balls used in competition have a diameter of at least 1.68 inches. There is no upper limit so many golf balls have an overall diameter falling within the range of about 1.68 to about 1.80 inches. The golf ball diameter is preferably about 1.68 to 1.74 inches, more preferably about 1.68 to 1.70 inches. In accordance with the present invention, the weight, diameter, and thickness of the core and cover layers may be adjusted, as needed, so the ball meets USGA specifications of a maximum weight of 1.62 ounces and a minimum diameter of at least 1.68 inches.

Preferably, the golf ball has a Coefficient of Restitution (CoR) of at least 0.750 and more preferably at least 0.800 (as measured per the test methods below). The core of the golf ball generally has a compression in the range of about 30 to about 130 and more preferably in the range of about 70 to about 110 (as measured per the test methods below.) These properties allow players to generate greater ball velocity off the tee and achieve greater distance with their drives. At the same time, the relatively thin outer cover layer means that a player will have a more comfortable and natural feeling when striking the ball with a club. The ball is more playable and its flight path can be controlled more easily. This control allows the player to make better approach shots near the green. Furthermore, the outer covers of this invention have good impact durability and mechanical strength.

The following test methods may be used to obtain certain properties in connection with the inventive tri-part thermoplastic blend of the invention as well as other materials that may be incorporated in golf balls of the invention.

Hardness.

The center hardness of a core is obtained according to the following procedure. The core is gently pressed into a hemispherical holder having an internal diameter approximately slightly smaller than the diameter of the core, such that the core is held in place in the hemispherical of the holder while concurrently leaving the geometric central plane of the core exposed. The core is secured in the holder by friction, such that it will not move during the cutting and grinding steps, but the friction is not so excessive that distortion of the natural shape of the core would result. The core is secured such that the parting line of the core is roughly parallel to the top of the holder. The diameter of the core is measured 90 degrees to this orientation prior to securing. A measurement is also made from the bottom of the holder to the top of the core to provide a reference point for future calculations. A rough cut is made slightly above the exposed geometric center of the core using a band saw or other appropriate cutting tool, making sure that the core does not move in the holder during this step. The remainder of the core, still in the holder, is secured to the base plate of a surface grinding machine. The exposed 'rough' surface is ground to a smooth, flat surface, revealing the geometric center of the core, which can be verified by measuring the height from the bottom of the holder to the exposed surface of the core, making sure that exactly half of the original height of the core, as measured above, has been removed to within 0.004 inches. Leaving the core in the holder, the center of the core is found with a center square and carefully marked and the hardness is measured at the center mark according to ASTM D-2240. Additional hardness measurements at any distance from the center of the core can then be made by drawing a line radially outward from the center mark, and measuring the hardness at any given distance along the line, typically in 2 mm increments from the center. The hardness at a particular distance from the center should be measured along at least two, preferably four, radial arms located 180° apart, or 90° apart, respectively, and then averaged. All hardness measurements performed on a plane passing through the geometric center are performed while the core is still in the holder and without having disturbed its orientation, such that the test surface is constantly parallel to the bottom of the holder, and thus also parallel to the properly aligned foot of the durometer.

The outer surface hardness of a golf ball layer is measured on the actual outer surface of the layer and is obtained from the average of a number of measurements taken from opposing hemispheres, taking care to avoid making measurements on the parting line of the core or on surface defects, such as holes or protrusions. Hardness measurements are made pursuant to ASTM D-2240 "Indentation Hardness of Rubber and Plastic by Means of a Durometer." Because of the curved surface, care must be taken to ensure that the golf ball or golf ball sub-assembly is centered under the durometer indenter before a surface hardness reading is obtained. A calibrated, digital durometer, capable of reading to 0.1 hardness units is used for the hardness measurements. The digital durometer must be attached to, and its foot made parallel to, the base of an automatic stand. The weight on the durometer and attack rate conforms to ASTM D-2240.

In certain embodiments, a point or plurality of points measured along the "positive" or "negative" gradients may be above or below a line fit through the gradient and its outermost and innermost hardness values. In an alternative preferred embodiment, the hardest point along a particular steep "positive" or "negative" gradient may be higher than the value at the innermost of the inner core (the geometric center) or outer core layer (the inner surface)—as long as the outermost point (i.e., the outer surface of the inner core) is greater than (for "positive") or lower than (for "negative") the innermost point (i.e., the geometric center of the inner core or the inner surface of the outer core layer), such that the "positive" and "negative" gradients remain intact.

As discussed above, the direction of the hardness gradient of a golf ball layer is defined by the difference in hardness measurements taken at the outer and inner surfaces of a particular layer. The center hardness of an inner core and hardness of the outer surface of an inner core in a single-core ball or outer core layer are readily determined according to the test procedures provided above. The outer surface of the inner core layer (or other optional intermediate core layers) in a dual-core ball are also readily determined according to the procedures given herein for measuring the outer surface hardness of a golf ball layer, if the measurement is made prior to surrounding the layer with an additional core layer. Once an additional core layer surrounds a layer of interest, the hardness of the inner and outer surfaces of any inner or intermediate layers can be difficult to determine. Therefore, for purposes of the present invention, when the hardness of the inner or outer surface of a core layer is needed after the inner layer has been surrounded with another core layer, the test procedure described above for measuring a point located 1 mm from an interface is used.

Also, it should be understood that there is a fundamental difference between "material hardness" and "hardness as measured directly on a golf ball." For purposes of the present invention, material hardness is measured according to ASTM D2240 and generally involves measuring the hardness of a flat "slab" or "button" formed of the material. Surface hardness as measured directly on a golf ball (or other spherical surface) typically results in a different hardness value. The difference in "surface hardness" and "material hardness" values is due to several factors including, but not limited to, ball construction (that is, core type, number of cores and/or cover layers, and the like); ball (or sphere) diameter; and the material composition of adjacent layers. It also should be understood that the two measurement techniques are not linearly related and, therefore, one hardness value cannot easily be correlated to the other. Shore hardness (for example, Shore C or Shore D or Shore A hardness) was measured according to the test method ASTM D-2240.

Modulus.

As used herein, "modulus" or "flexural modulus" refers to flexural modulus as measured using a standard flex bar according to ASTM D790-B.

Tensile Strength.

As used herein, tensile strength refers to tensile strength as measured using ASTM D-638.

Ultimate Elongation.

As used herein, ultimate elongation refers to ultimate elongation as measured using ASTM D-638.

Compression.

As disclosed in Jeff Dalton's Compression by Any Other Name, Science and Golf IV, Proceedings of the World Scientific Congress of Golf (Eric Thain ed., Routledge, 2002) ("J. Dalton"), several different methods can be used to measure compression, including Atti compression, Riehle compression, load/deflection measurements at a variety of fixed loads and offsets, and effective modulus. For purposes of the present invention, compression refers to Soft Center Deflection Index ("SCDI"). The SCDI is a program change for the Dynamic Compression Machine ("DCM") that allows determination of the pounds required to deflect a core 10% of its diameter. The DCM is an apparatus that applies a load to a core or ball and measures the number of inches the core or ball is deflected at measured loads. A crude load/deflection curve is generated that is fit to the Atti compression scale that results in a number being generated that represents an Atti compression. The DCM does this via a load cell attached to the bottom of a hydraulic cylinder that is triggered pneumatically at a fixed rate (typically about 1.0 ft/s) towards a stationary core. Attached to the cylinder is an LVDT that measures the distance the cylinder travels during the testing timeframe. A software-based logarithmic algorithm ensures that measurements are not taken until at least five successive increases in load are detected during the initial phase of the test. The SCDI is a slight variation of this set up. The hardware is the same, but the software and output has changed. With the SCDI, the interest is in the pounds of force required to deflect a core x amount of inches. That amount of deflection is 10% percent of the core diameter. The DCM is triggered, the cylinder deflects the core by 10% of its diameter, and the DCM reports back the pounds of force required (as measured from the attached load cell) to deflect the core by that amount. The value displayed is a single number in units of pounds.

Coefficient of Restitution ("CoR").

The CoR is determined according to a known procedure, wherein a golf ball or golf ball sub-assembly (for example, a golf ball core) is fired from an air cannon at two given velocities and a velocity of 125 ft/s is used for the calculations. Ballistic light screens are located between the air cannon and steel plate at a fixed distance to measure ball velocity. As the ball travels toward the steel plate, it activates each light screen and the ball's time period at each light screen is measured. This provides an incoming transit time period which is inversely proportional to the ball's incoming velocity. The ball makes impact with the steel plate and rebounds so it passes again through the light screens. As the rebounding ball activates each light screen, the ball's time period at each screen is measured. This provides an outgoing transit time period which is inversely proportional to the ball's outgoing velocity. The CoR is then calculated as the ratio of the ball's outgoing transit time period to the ball's incoming transit time period ($CoR=V_{out}/V_{in}=T_{in}/T_{out}$).

Thermoset and thermoplastic layers herein may be treated in such a manner as to create a positive or negative hardness gradient within and between golf ball layers. In golf ball layers of the present invention wherein a thermosetting rubber is used, gradient-producing processes and/or gradient-producing rubber formulation may be employed. Gradient-producing processes and formulations are disclosed more fully, for example, in U.S. patent application Ser. No. 12/048,665, filed on Mar. 14, 2008; Ser. No. 11/829,461, filed on Jul. 27, 2007; Ser. No. 11/772,903, filed Jul. 3, 2007; Ser. No. 11/832,163, filed Aug. 1, 2007; Ser. No. 11/832,197, filed on Aug. 1, 2007; the entire disclosure of each of these references is hereby incorporated herein by reference.

It is understood that the golf balls of the invention, incorporating at least one layer of inventive tri-part thermoplastic blend, as described and illustrated herein represent only some of the many embodiments of the invention. It is appreciated by those skilled in the art that various changes and additions can be made to such golf balls without departing from the spirit and scope of this invention. It is intended that all such embodiments be covered by the appended claims.

A golf ball of the invention may further incorporate indicia, which as used herein, is considered to mean any symbol, letter, group of letters, design, or the like, that can be added to the dimpled surface of a golf ball.

Golf balls of the present invention will typically have dimple coverage of 60% or greater, preferably 65% or greater, and more preferably 75% or greater. It will be appreciated that any known dimple pattern may be used with any number of dimples having any shape or size. For example, the number of dimples may be 252 to 456, or 330 to 392 and may comprise any width, depth, and edge angle. The parting line configuration of said pattern may be either a straight line or a staggered wave parting line (SWPL), for example.

In any of these embodiments the single-layer core may be replaced with a two or more layer core wherein at least one core layer has a hardness gradient.

Other than in the operating examples, or unless otherwise expressly specified, all of the numerical ranges, amounts, values and percentages such as those for amounts of materials and others in the specification may be read as if prefaced by the word "about" even though the term "about" may not expressly appear with the value, amount or range. Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements. Furthermore, when numerical ranges of varying scope are set forth herein, it is contemplated that any combination of these values inclusive of the recited values may be used.

Although the golf ball of the invention has been described herein with reference to particular means and materials, it is to be understood that the invention is not limited to the particulars disclosed and extends to all equivalents within the scope of the claims.

It is understood that the manufacturing methods, compositions, constructions, and products described and illustrated herein represent only some embodiments of the invention. It is appreciated by those skilled in the art that various changes and additions can be made to compositions, constructions, and products without departing from the spirit and scope of this invention. It is intended that all such embodiments be covered by the appended claims.

What is claimed is:

1. A golf ball comprising a core and at least one layer comprising a thermoplastic blend of (i) at least one ionomer; (ii) at least one thermoplastic polyurethane; (iii) at least one reactive crosslinker consisting of maleic group-modified polymer(s), glycidyl (meth)acrylate-modified polymer(s), or combinations thereof ("PGM"); and (iv) at least one catalyst;

wherein the ionomer is present in an amount of about 45 wt % or greater and the PGM is present in an amount of from about 2 wt % to about 35 wt %.

2. The golf ball of claim 1, wherein the thermoplastic polyurethane is present in an amount of from about 8 wt % to about 50 wt %.

3. The golf ball of claim 2, wherein the thermoplastic polyurethane is present in an amount of from about 25 wt % to about 45 wt %.

4. The golf ball of claim 3, wherein the thermoplastic polyurethane is present in an amount of from about 35 wt % to about 50 wt %.

5. The golf ball of claim 2, wherein the ionomer is present in an amount greater than the amount of thermoplastic polyurethane.

6. The golf ball of claim 1, wherein the ionomer is present in an amount of from about 45 wt % to about 70 wt %.

7. The golf ball of claim 1, wherein the thermoplastic polyurethane is present in an amount greater than 20 wt % and up to about 40 wt %; and the PGM is present in an amount of from about 5 wt % to about 30 wt %.

8. The golf ball of claim 1, wherein the PGM is present in the thermoplastic blend in an amount of from about 15 wt % to about 35 wt %.

9. The golf ball of claim 1, wherein the at least one catalyst is selected from the group consisting of 1,8-diazabicyclo[5.4.0]undec-7-ene (DBU), triphenylphosphino imidazole catalysts, chromium III complexes, oxo-centered trinuclear Cr III complexes, 1,4-diazabicyclo[2.2.2]octane, liquid epoxy catalysts, and combinations thereof.

10. The golf ball of claim 1, wherein at least one catalyst is a tertiary amine.

11. The golf ball of claim 1, wherein the at least one catalyst is included in the thermoplastic blend in an amount of from 0.1 to 10 parts based on 100 parts of PGM.

12. The golf ball of claim 1, wherein the at least one catalyst is included in the thermoplastic blend in an amount of from about 1.0 to 5.0 parts based on 100 parts of PGM.

13. The golf ball of claim 1, wherein the thermoplastic polymer has a material hardness of from about 20 Shore D to about 65 Shore D.

14. The golf ball of claim 1, wherein the thermoplastic blend has a material hardness that is different than the material hardness of the thermoplastic polymer.

15. The golf ball of claim 1, wherein the thermoplastic blend has a material hardness greater than about 20 Shore D and up to about 70 Shore D.

16. The golf ball of claim 1, wherein the at least one layer is a cover layer that surrounds the core and has a hardness H that differs from a hardness $H_{(ii)}$ of (ii) by at least about 5 Shore D hardness points; wherein (ii) has a hardness of from about 20 Shore D to about 70 Shore D.

17. The golf ball of claim 1, wherein the at least one layer is an inner cover layer that surrounds the core and is surrounded by an outer cover layer and has a hardness H that differs from a hardness $H_{(ii)}$ of (ii) by at least about 5 Shore D hardness points; wherein (ii) has a hardness of from about 20 Shore D to about 70 Shore D.

18. The golf ball of claim 1, wherein the at least one layer consists of the thermoplastic blend.

\* \* \* \* \*